United States Patent
Hales et al.

(10) Patent No.: US 6,288,739 B1
(45) Date of Patent: Sep. 11, 2001

(54) DISTRIBUTED VIDEO COMMUNICATIONS SYSTEM

(75) Inventors: Jon Benedict Hales, Grand Prairie, TX (US); Michael David Mills, Pittsburgh, PA (US); Nancy Elizabeth Hendrick Miracle, Colleyville, TX (US)

(73) Assignee: Intelect Systems Corporation, Richardson, TX (US)

( * ) Notice: Subject to any disclaimer, the term of this patent is extended or adjusted under 35 U.S.C. 154(b) by 0 days.

(21) Appl. No.: 08/926,256

(22) Filed: Sep. 5, 1997

(51) Int. Cl.$^7$ ............................ H04N 7/14; H04N 7/173; G06F 15/16

(52) U.S. Cl. ............................ 348/14.07; 348/14.02; 348/14.12; 709/204; 709/206; 709/236; 725/106

(58) Field of Search ................... 348/15, 16, 17, 348/14.07, 14.02, 14.12; 709/204, 205, 206, 207, 227, 228, 229, 104, 236; 395/200.68, 200.34, 200.1; 382/248; 707/104; 725/106

(56) References Cited

U.S. PATENT DOCUMENTS

| | | |
|---|---|---|
| 5,003,532 | 3/1991 | Ashida et al. . |
| 5,179,551 | 1/1993 | Turner . |
| 5,195,086 | 3/1993 | Baumgartner et al. . |
| 5,227,875 | 7/1993 | Suu et al. . |
| 5,237,571 | 8/1993 | Cotton et al. . |
| 5,243,596 | 9/1993 | Port et al. . |
| 5,257,306 | 10/1993 | Watanabe . |
| 5,289,460 | 2/1994 | Drake, Jr. et al. . |
| 5,291,477 | 3/1994 | Liew . |
| 5,303,311 | 4/1994 | Epting et al. . |
| 5,309,430 | 5/1994 | Verhille et al. . |
| 5,309,433 | 5/1994 | Cidon et al. . |
| 5,325,356 | 6/1994 | Lyles . |
| 5,345,558 | 9/1994 | Opher et al. . |
| 5,361,256 | 11/1994 | Doeringer et al. . |
| 5,374,952 | * 12/1994 | Flohr ........................................ 348/12 |

(List continued on next page.)

FOREIGN PATENT DOCUMENTS 0 716 533 A2   11/1995   (EP) .

OTHER PUBLICATIONS

Fatemi, O., Idris, F. and Panchanathan S., "FPGA Implementation of the LRU algorithm for video compression," 8087 IEEE Transaction on Consumer Electronics (1994) Aug, No. 3, New York, US.

Primary Examiner—Wendy R. Garber
Assistant Examiner—Hai V. Tran
(74) Attorney, Agent, or Firm—Howison, Chauza, Thoma, Handley & Arnott, LLP

(57) ABSTRACT

The distributed video communications system includes a plurality of nodes (10). Each of the nodes interfaces with a network that is comprised of a messaging layer (16) and a data transmission layer (14). Data is transmitted from each of the nodes to the data transmission layer in a multicast protocol such that all of the other nodes have access to the information transmitted thereto. Each of the nodes has configuration information stored in a conference configuration block (22) which is received through the messaging layer (16). A conference can be initiated by any of the nodes (10) by transmitting information as to the conferees in a conference to the other of the nodes in the conference. Each of the nodes (10) independently determines from the configuration information associated therewith the manner in which data is to be extracted from the messaging layer (14) and the manner in which it is displayed. The information consists of video and audio information which is compressed and/or decompressed utilizing a wavelet algorithm. The operation of each of the nodes (10) is independent from the operation of the other nodes with the configuration information also being determined solely by the associated node.

27 Claims, 19 Drawing Sheets

U.S. PATENT DOCUMENTS

| | | |
|---|---|---|
| 5,402,415 | 3/1995 | Turner . |
| 5,408,465 | 4/1995 | Gusella et al. . |
| 5,412,654 | 5/1995 | Perkins . |
| 5,418,937 | 5/1995 | Inoue . |
| 5,440,549 | 8/1995 | Min et al. . |
| 5,444,702 | 8/1995 | Burnett et al. . |
| 5,473,367 | 12/1995 | Bales et al. . |
| 5,491,508 | 2/1996 | Friedell et al. . |
| 5,511,168 | 4/1996 | Perlman et al. . |
| 5,537,400 | 7/1996 | Diaz et al. . |
| 5,537,737 | 7/1996 | Lo et al. . |
| 5,557,724 | 9/1996 | Sampat et al. . |
| 5,561,637 | 10/1996 | Dan et al. . |
| 5,617,539 | 4/1997 | Ludwig et al. . |
| 5,630,184 * | 5/1997 | Roper et al. ........................ 395/200.1 |
| 5,661,569 | 8/1997 | Mies et al. . |
| 5,687,095 * | 11/1997 | Haskell et al. ........................ 364/514 |
| 5,748,736 * | 5/1998 | Mittra ........................ 380/21 |
| 5,757,974 * | 5/1998 | Impagliazzo et al. ............... 382/248 |
| 5,760,794 * | 6/1998 | Munson et al. ........................ 345/515 |
| 5,812,786 * | 9/1998 | Seazholtz et al. ............... 395/200.63 |
| 5,828,838 * | 10/1998 | Downs et al. ........................ 709/204 |
| 5,854,893 * | 12/1998 | Ludwig et al. ................. 395/200.34 |
| 5,867,653 | 2/1999 | Aras et al. . |
| 5,890,162 * | 3/1999 | Huckins ........................ 707/104 |
| 5,923,853 * | 7/1999 | Danneels ........................ 395/200.68 |
| 5,938,734 * | 8/1999 | Yao et al. ........................ 709/232 |

\* cited by examiner

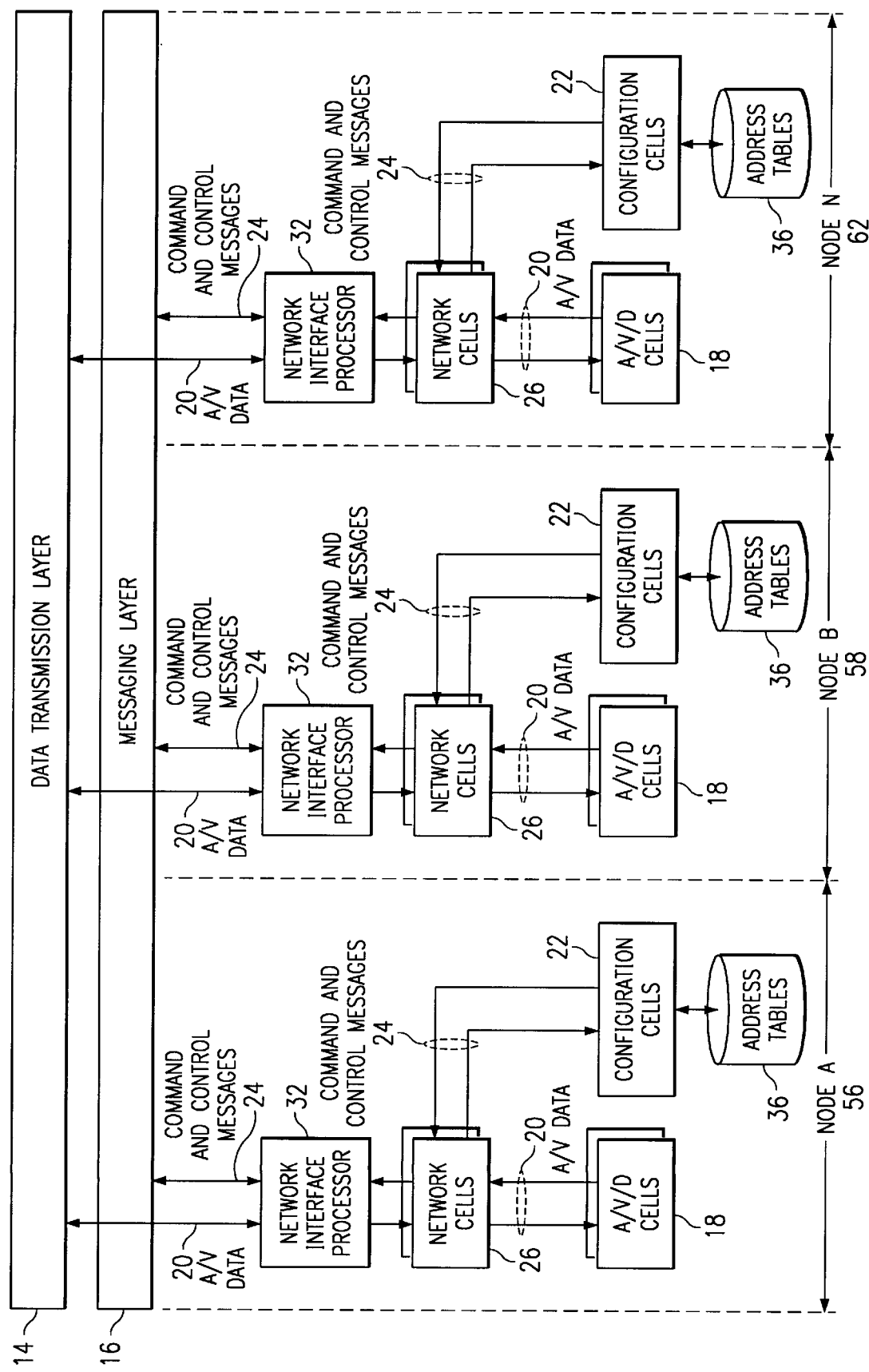

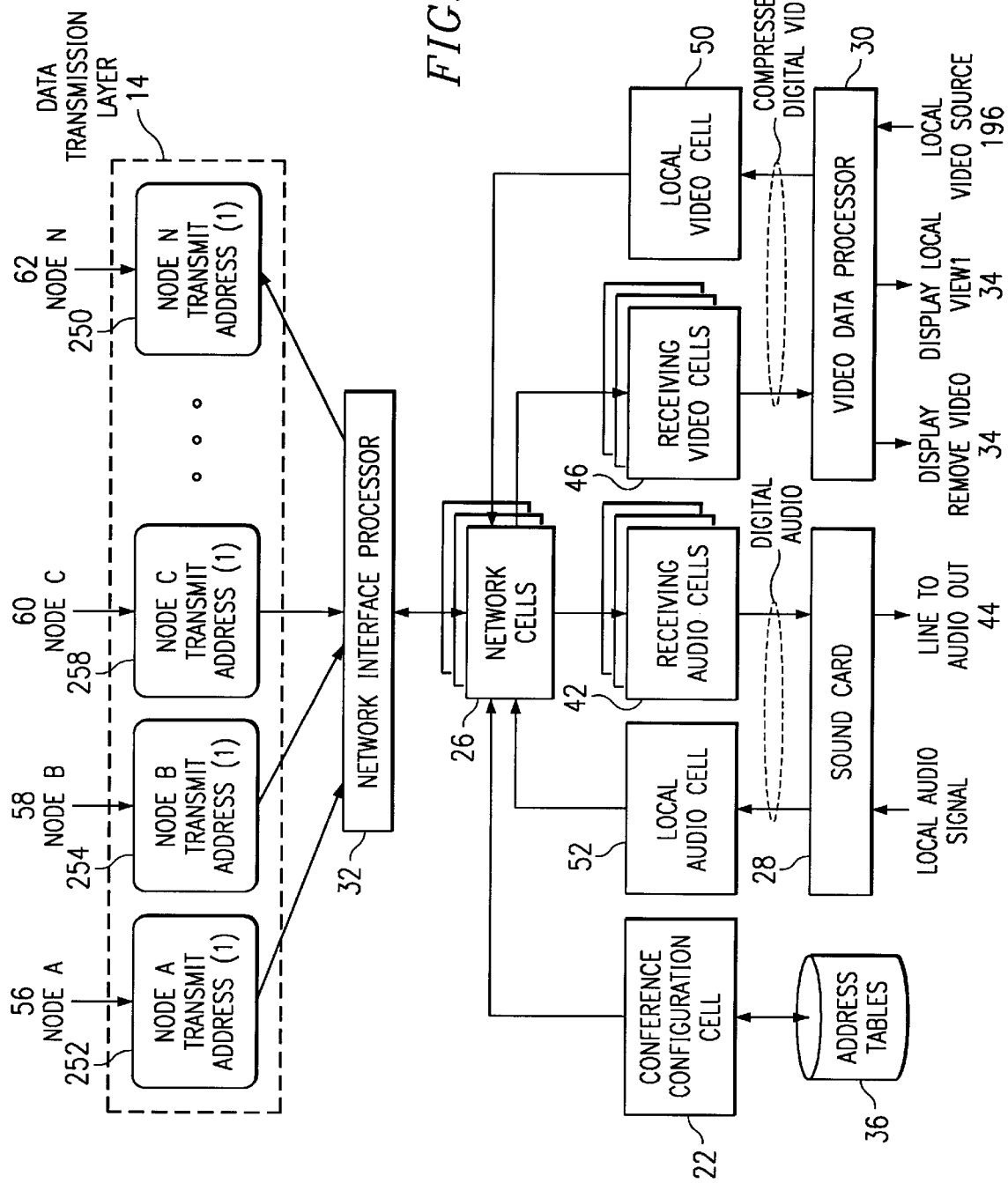

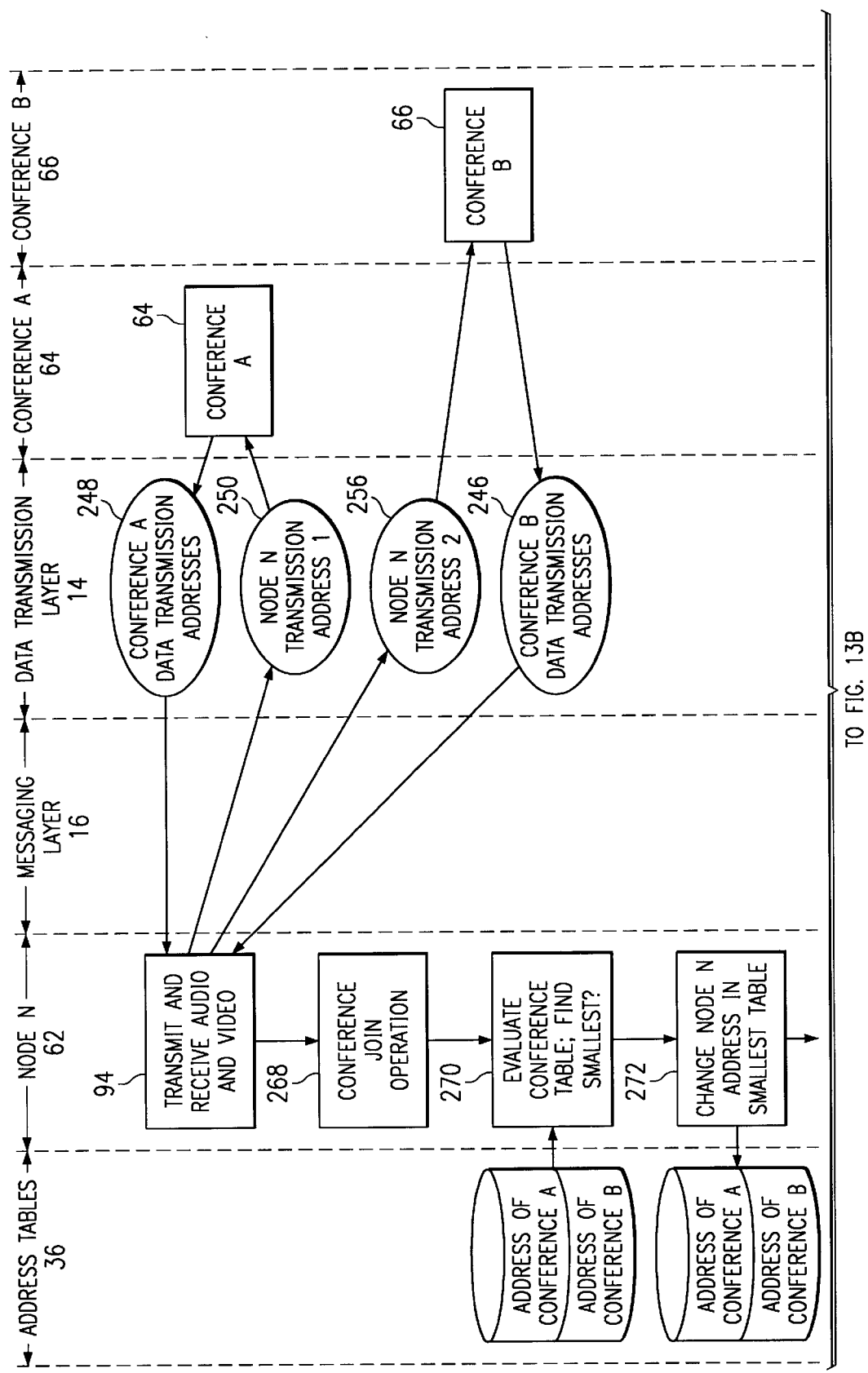

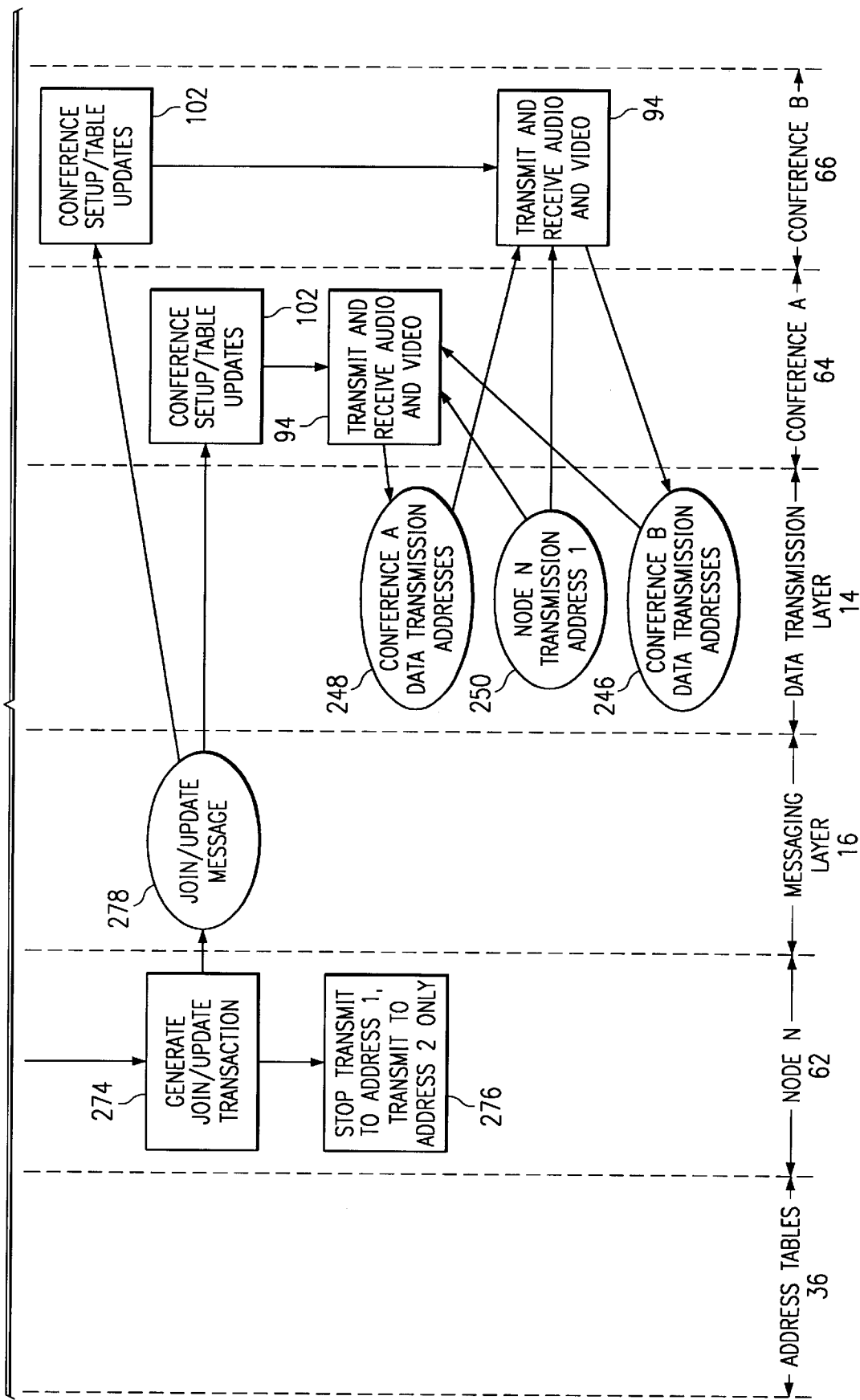

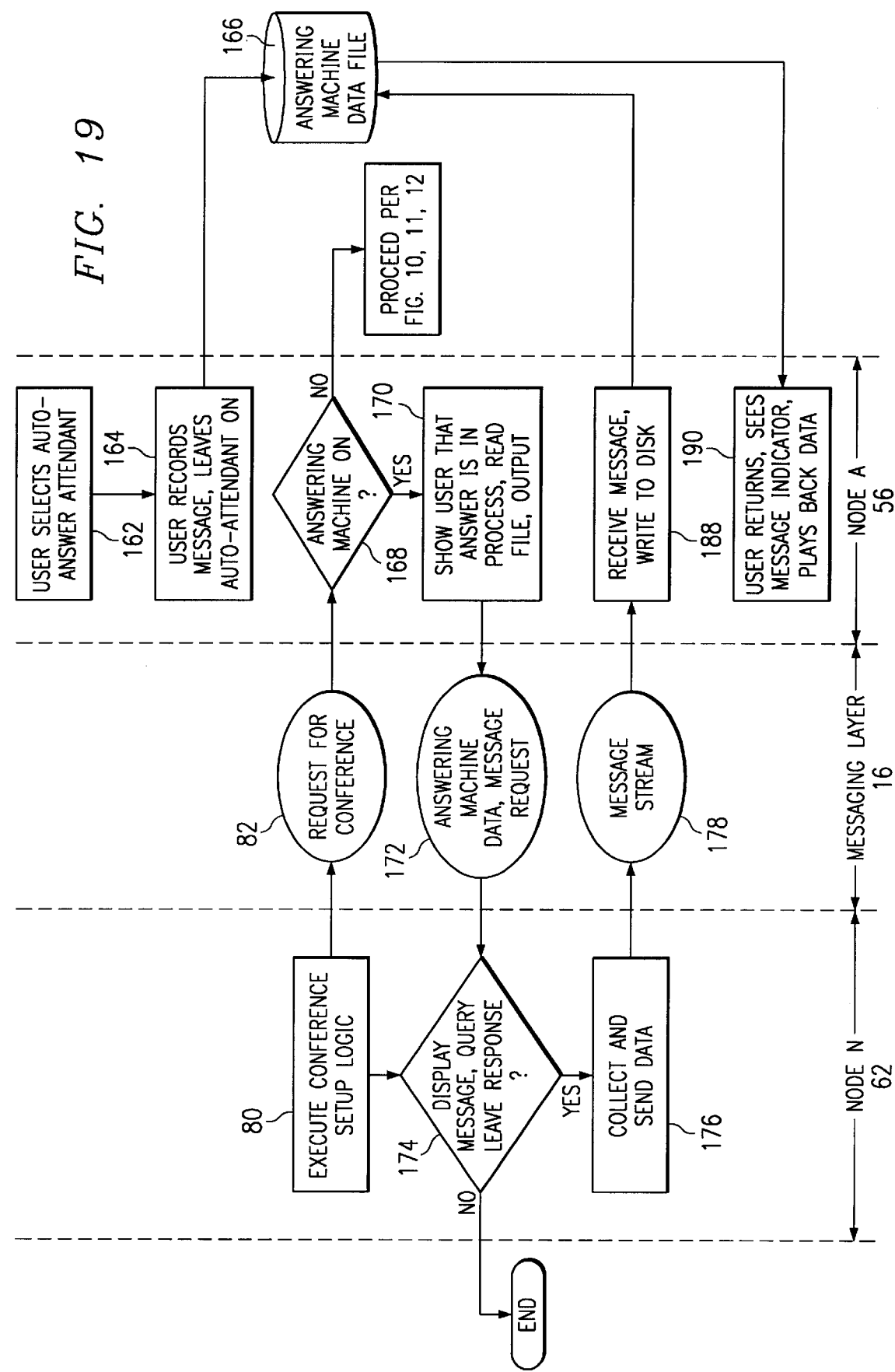

DISTRIBUTED VIDEO COMMUNICATIONS SYSTEM

TECHNICAL FIELD OF THE INVENTION

The present invention pertains in general to video communication systems and, more particularly, to a video communications system that utilizes an architecture of distributed control to allow each of the users to manage their individual communications environment.

BACKGROUND OF THE INVENTION

The demand for improved communications between people that are separated by distance and time has greatly increased in the last twenty or thirty years. The introduction of the telephone facilitated audio communication between people that were physically separated. Voice mail extended this, allowing people separated by both time and distance to exchange audio communication.

While these innovations satisfy many communications needs, the amount of information that can be conveyed solely by audio communication between people separated by distance falls far short of the total amount of information transferred between people in a face-to-face meeting. This need was met by the introduction of video conferencing systems. In a typical video conferencing system, the goal is to provide a connection between remote sites such that a plurality of users or "conferees" can communicate with each other as easily as if they were in the same room and sitting at the same conference table.

One characteristic of human behavior, however, is that less than fifty percent of the average conferee's time in a normal conference situation is actually spent observing either the presenter of the information or the material they are presenting. The majority of the conferee's time is actually spent examining their own material, speaking to others or observing other participants, building silent consensus or disagreement.

Prior art video systems are not capable of displaying more than a single video stream during video conferencing. As a corollary to this, since multiple sessions are not supported, prior art video conferencing systems did not allow the user to participate simultaneously in separate conferences or offer them the control needed to manage such conferences.

When surrounded by a barrage of sensory input, people selectively direct their attention to individual perceptual events, choosing to focus on individual components of their visual and aural fields. In a real conference room setting, conferees can easily direct and focus their attention toward different inputs with a simple turn of the head or movement of the eyes. A satisfactory remote conferencing experience must allow each participant to focus their visual and aural attention in a manner that closely follows natural (in-person) usage. This factor is particularly significant when there is more than one source of information.

Where multiple conferees or conferences were involved, prior art video conferencing systems did not provide any level of control to the participants, but either (a) merged multiple video streams into a single one or (b) switched/routed the data in a predetermined configuration. Typically, this conference configuration was determined by a server (or "master") that controlled the switching network. The server was the ultimate determiner of the video that is viewed by each conferee and was responsible for generating a data stream tailored to the characteristics of each participating entity. When only a few conferees were involved, the approach worked tolerably, but when many video sources were involved, the situation proved to be inherently unsatisfactory for most users.

No algorithm for determining a selection between multiple video sources has been found to be universally acceptable. Examples of such algorithms include fixed view (no switching), time-based switching (in which each participant is displayed in succession) and even an algorithm that determines the loudest speaker and switches the video source such that everyone views the loudest speaker. The latter, of course, introduces problems into the conference environment because people become aware of how the algorithm works and raise their voices to force their image to appear on the screens of the other conferees, causing the conference to devolve into a shouting match.

In general, prior art did not allow the client conferees to tailor either the logical or graphical structure of the conference to their needs and there is no universally acceptable algorithm that has been implemented at the server level for determining what a conferee would want to see. This significantly affected the attractiveness and, correspondingly, the acceptance of such systems.

A second problem with conventional video conferencing was that it did not allow the conferees to bridge the limitations of time as well as of distance. Conventional communications tools have solved this problem with the introduction of automated answering attendants, call forwarding, voice mail and electronic written mail. Parallel features were not included in prior art video conferencing systems, although communication across time as well as across distance is a critical factor to many users, particularly those who are so geographically separated as to be in different time zones.

Another problem arises from the fact that most prior art video conferencing systems were designed to support conferencing between parties connected only by the global telephone network. Even when compressed, the number of bits (and, correspondingly, bandwidth) required to represent video data significantly exceeds that which is required to represent audio data. The global telephone system was originally designed to transmit analog signals and is still in the process of being converted to handle digital data. While the amount of bandwidth available for normal use has steadily increased, conventional telephone lines still do not have the capacity to support the transmission of the large amount of data necessary for video conferencing. Because of this fact, most prior art video conferencing systems operated over high bandwidth point-to-point lines and, since these can be terminated only at a single point, implicitly required a dedicated video conferencing center at the termination point.

A few video conferencing systems have been designed that utilize data networks for information transfer. However, as described earlier, in virtually all such systems, information is routed through a server or host which controls and tailors the individual data streams. Because of the lack of control that it affords them, this architecture has proved to be unsatisfactory to most end users. An additional (and more subtle) problem arises with this design in that such systems are vulnerable to single-point failures; if the host becomes unavailable or leaves the conference, there is no provision for the conference to continue.

However, a significant problem exists in the addressing structure of most data communications networks inasmuch as each node must have a unique address. With a separate address for each conferee, most video conferencing systems must operate in a manner wherein dedicated information must be structured and addressed to a single user. The methodologies employed vary from systems in which the originator acts as the server, generating multiple video and audio streams, each uniquely addressed to an end user; to centrally arranged switching systems and special-purpose multi-party conference units (MCUs). In all these architectures, however, individual message streams are required for each end user. This significantly increases the bandwidth requirements of a given network as the number of participants per conference increases. The formula for calculating the number of data streams in this architecture is [nb(n−1)] where n is the number of participants and b is the bandwidth required per participant. Thus, an eight-party conference where each user needs 10 megabits per second (Mbps) requires a data service capable of 560 Mbps [8*10Mbps*(8−1)]. The amount of bandwidth mandated by this architecture is so high that it has effectively precluded the implementation and deployment of any video conferencing system with more than four nodes.

One application of a video conferencing system that has not been realized to any viable extent is that of transmitting voice and video information for multi-party conferencing in a real-time mode over the global communications network (or a subset thereof) utilizing the communications protocols native to that network (Transmission Control Protocol "TCP/IP," User Datagram Protocol "UDP" or IP Multicast). Even if such methods were available, the bandwidth available on most of these networks could not support real-time audio and video transmission. However, it is anticipated in the future that the bandwidth of these networks will increase to support such an application.

In summary, prior art video communications systems have proved to be unsatisfactory to most users in a number of ways:

1. prior art video communications systems did not allow conferees to control their view of the conference in any manner that approaches natural experience;
2. prior art video communications systems did not allow conferees to communicate unless all conferees are present at the same time;
3. prior art video communications systems did not allow the user to participate in more than one conference at a time;
4. prior art video communications systems did not allow every video and audio data stream in a multi-party conference to have different characteristics;
5. prior art video communications systems that utilize the global telephone network for transmission required point-to-point communications lines, which limit conferences to certain pre-defined physical locations;
6. prior art video communications systems that utilize data networks for transmission had a client/server or host/slave architecture, which renders them vulnerable to failure;
7. prior art video communications systems generally required a large amount of bandwidth as a function of their addressing structures; and
8. prior art video communications systems did not utilize the developing global communications network.

SUMMARY OF THE INVENTION

The present invention disclosed and claimed herein comprises a video communication system. The video communication system includes a data communications network and a plurality of nodes disposed about the data communications network. Each of the nodes includes a video source for generating digital video data and a data transmitter. The data transmitter is operable to transmit the digital video data to the communication network on a defined address in a message protocol. The digital video data at the defined address is accessible over the communication network by substantially all the nodes associated therewith. A data receiver is provided in each of the nodes for receiving from the network digital video data at the defined addresses. The configuration table is provided for storing information as to select ones of the defined addresses on the communications network to define a local group of select ones of the defined addresses for the associated node. A configuration device is provided for configuring the configuration table at each of the nodes to define the local group for the associated node and to control the data receiver to receive only video data from one of the defined addresses within the local group. The display device processes and displays digital video data received from the communications network at select ones of the defined addresses within the local group. The configuration device associated with the node determines which of the ones of the defined addresses in the local group constitute the select ones for displaying the associated video data by the display device.

In another aspect of the present invention, the defined addresses on the communication network are in a multicast address protocol which are receivable by all the nodes interfaced with the network. The configuration device is operable to control the data receiver to receive digital audio data from the communication network at substantially all of the defined addresses in the local group.

In a further aspect of the present invention, each of the nodes includes a data compression device for selectively compressing a portion of the digital video data prior to transmission thereof, and decompressing the received digital video data in accordance with a predetermined data compression/decompression algorithm. This algorithm is a wavelet data compression algorithm.

In yet another aspect of the present invention, the communication network comprises a message portion and a command portion. The command portion carries command information between the nodes and the command protocol, and the message portion carries the transmitted digital video data on the defined addresses from all of the nodes in the message protocol. Each of the nodes has associated therewith a command generator for generating command information for transmission to at least one of the other nodes. A command transmitter is provided for transmitting generated command information over the network with a command receiver provided for receiving command information from other of the nodes addressed thereto over the command portion of the network. A command decoder decodes the received command information, which command information is then utilized by the configuration device to generate the information stored in the configuration table.

In yet a further aspect of the present invention, an encryption/decryption device is provided for encrypting information transmitted to receiving ones of the nodes. Encryption information is transmitted over the command portion of the network. Further, the data transmitter operates independently of the data receiver on the other of the nodes, with the data receivers on each of the nodes operating independently from other data receivers on other open nodes.

In an even further aspect of the present invention, the local group of the select defined addresses includes a logical group of defined addresses that define a call. The logical group of defined addresses with the local group are stored in the configuration tables for each of the nodes associated with the addresses in the logical group. The logical group defines a conference between multiple nodes with the conference comprised of the addresses in the logical group. Each of the nodes in the call has associated therewith all of the addresses in the logical group.

BRIEF DESCRIPTION OF THE DRAWINGS

For a more complete understanding of the present invention and the advantages thereof, reference is now made to the following descriptions taken in conjunction with the accompanying Drawings in which:

FIG. 2 illustrates a more detailed view of each of the nodes;

FIG. 3 illustrates a more detailed view of each of the nodes and their internal configuration and the architecture of a non-secured, joined multi-party conference;

FIG. 13 illustrates a flowchart depicting the process of joining two disjunctive conferences;

FIG. 19 illustrates a flowchart depicting the features for the video answering machine;

DETAILED DESCRIPTION OF THE INVENTION

Architecture: Overview

Figure 1:
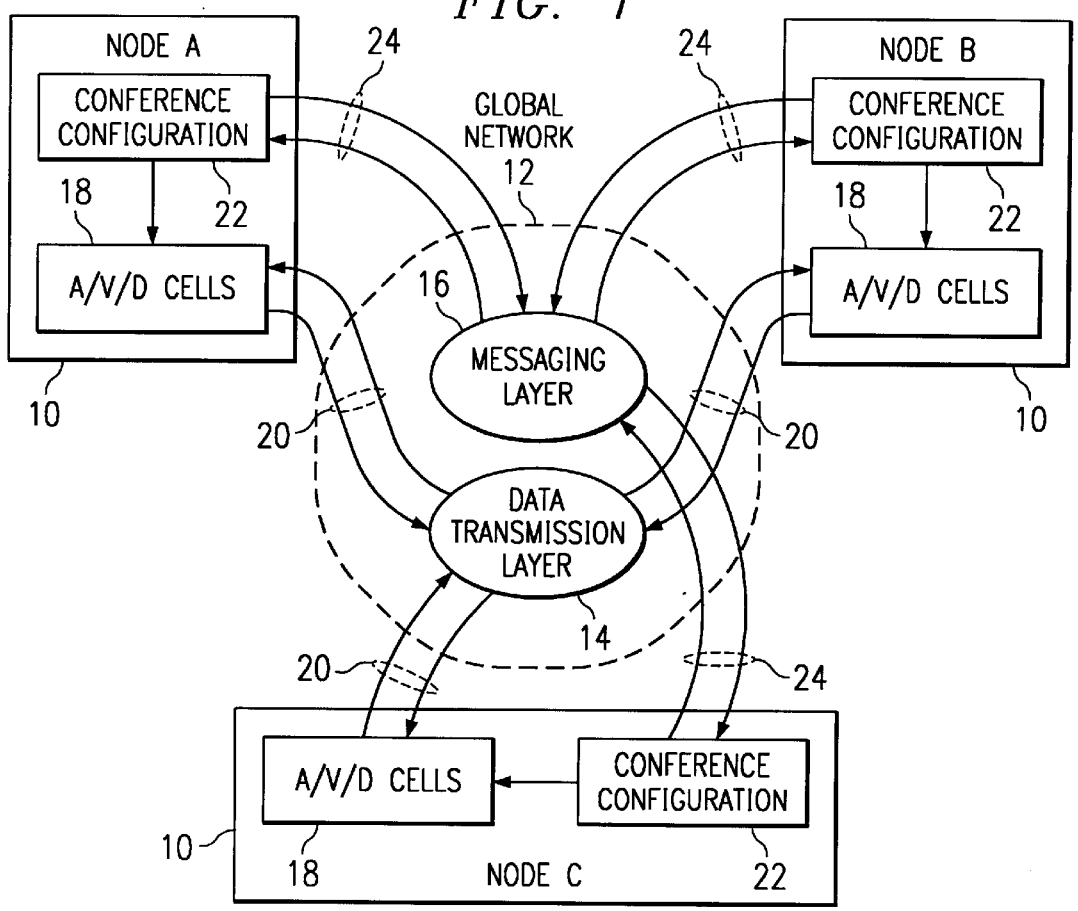
FIG. 1 illustrates an overall block diagram of the distributed network.

Referring now to FIG. 1, there is illustrated a diagrammatic view of a distributed network operating according to the present invention. There are multiple nodes in the network; three nodes 10 are illustrated, labeled node A, node 3 and node 4. Each of these nodes is interfaced to a global network 12 or a subset of the global network 12 (referred to hereinafter as "the network").

Every computer using the protocols of the network 12 must have a unique 32-bit address. This is called the "IP address" and contains sufficient information to uniquely identify a network and a specific computer on the network 12. On the network 12, these addresses are used to move traffic (messages) from router to router across the network backbone to their eventual recipient. It is this address that is also utilized at the local level by the local network hardware such as servers, routers, concentrators and hubs to switch messages to the appropriate destination.

For purposes of the description that follows, the network 12 is considered to consist of four architectural layers: the Application Layer, the Transport Layer, the Internet Layer and the Physical Layer.

The application layer consists of applications that make use of the network.

The transport layer provides end-to-end delivery of messages.

The internet layer defines the datagram and handles the routing of datagrams. The datagram is the packet of data manipulated by the IP protocol and contains the source address, destination address and data, as well as other control fields.

The physical layer is beyond the scope of this discussion. The TCP/IP standard makes no effort to define the underlying network physical connectivity. Instead, it makes use of existing standards, such as those that define RS232, Ethernet™ and other electronic interfaces used in data communications. It should be noted that the logical IP address is generally different from the physical address of the network hardware. The Address Resolution Protocol (ARP) is used to map the logical IP addresses and host names into the physical addresses needed by the underlying network hardware. For example, if an Ethernet™ was in use on the local node, the node's response to an ARP request would be the 48-bit number that uniquely identifies every Ethernet™ device in existence. This level of network management is handled by the hardware responsible for the physical and internet layers. On the local network, the IP address information allows a particular network element to recognize information destined for themselves and to extract that (and only that) information from the network data flow.

When a packet of data is sent between IP nodes, it travels within the computer to the transport layer where the transport header is added. Next, the internet layer adds its header. Finally, the physical layer attaches its header and the packet is released to the network hardware. When a packet of data is received, the process is reversed, resulting in the application's receipt of the intended data.

Within the transport layer, there are defined different operational protocols with different characteristics, hereinafter called "IP protocols." The Transmission Control Protocol ("TCP") is a transaction format designed to ensure that data is delivered in order and without corruption. TCP provides a reliable stream-oriented delivery service with end-to-end error detection and correction. The reliability of TCP comes from the inclusion of a checksum into each packet and checksum processing upon receipt to ensure that incomplete datagrams are identified and resent. TCP messages are addressed to a specific user with a single defined address on the network 12.

The User Datagram Protocol ("UDP") allows data to be transferred over the network with a minimum of overhead. UDP provides "connectionless" packet delivery. UDP data delivery is unreliable and the data may be lost, duplicated or arrive out of order. UDP messages are also addressed to a single specific user, a process often described as "unicast."

The IP multicast protocol ("IPMC") provides for the transmission of an IP datagram to the members of an IP multicast "host group;" that is, a group of IP addresses in the special range of 224.0.0.0 to 239.255.255.255. A multicast datagram is delivered to all members of its destination host group with the same "best efforts" reliability as a regular unicast IP datagram. The membership of the host group is dynamic; that is, hosts may join and leave the group at any time. There is no restriction on the location or number of members of a host group. The host may be a member of more than one group at a time. The overall effect is that, by using the multicast protocol, data can be transmitted on the network 12 in such a manner that multiple nodes can retrieve it without having separately addressed messages. IPMC data delivery is unreliable by design and the data may be lost, duplicated or arrive out of order.

If each conferee is a separately addressable node on the network, the bandwidth of a multiparty conference can be computed as [nb(n−1)] where n is the number of nodes involved in the conference and b is the bandwidth required by each node to transmit audio and video data. In utilizing the multicast protocol, however, the number of data streams is simply equal to [nb] where n is the number of nodes involved in the conference and b is the bandwidth required per node. While all transmission protocols perform similarly when n is equal to 2, the amount of bandwidth required becomes increasingly significant as the number of nodes in the conference grows.

In the architecture of the present system, TCP/IP transactions are utilized by the application for messaging and control. While the network is actually a uniform IP-based network, all TCP/IP messages are considered hereinafter to belong to a set called the "TCP/IP layer" or the "messaging layer 16".

The present system utilizes UDP and multicast transactions to transfer audio and video data between nodes. When the number of nodes in the conference is equal to or less than two, the present system may use the UDP and multicast protocols interchangeably. When the number of nodes is greater than two, the IP multicast protocol is employed. However, for the sake of clarity, all IP Multicast (IPMC) and all User Datagram Protocol (UDP) messages are considered to be members of a set called the "multicast layer" or the "data transmission layer 14."

Referring to FIG. 1, each of the nodes 10 has associated therewith a group of processes, called hereinafter as a generic class "the audio/video/data cells" 18, labeled "A/V/D cells." These are independent functions that collect audio, video and other data, transmit this to other nodes through the data transmission layer 14, receive information from the data transmission layer 14 and display it to the end user.

Each node 10 also has associated therewith a conference configuration cell 22 that controls the A/V/D cells 18 of the node. Each of the conference configuration cells 22 is an independent, configurable application that communicates through the network with the other conferencing nodes' configuration cells 22 to exchange the configuration and control data necessary to start, maintain and terminate a conference. Since this information is critical to the successful continuation of the conference, the guaranteed-delivery messaging layer 16 is used to carry these messages. However, because the amount of information needed for this purpose is small, the bandwidth required by the operation of the messaging layer 16 is very low.

The video communications system is described in detail hereinbelow, but, in general, each of the nodes 10 is operable to set up a video conference by using the conference configuration cell 22 to interface with other nodes 10 through the messaging layer 16. The nodes' conference configuration cells 22 interchange information over the messaging layer 16 as to whom the conferees are in a particular conference and maintain an address table that describes the conference. This table contains the network addresses of every node in the conference, including both the node's address on the messaging layer 16 and the set of addresses (if different) that the node will use to send audio and video information on the data transmission layer 14. Once this information is available, conferencing can be initiated.

One of the distinguishing features of the present system is that the greatest part of the conference is conducted through the unreliable data transmission layer 14. When UDP transmission is used (when the number of conferencing nodes is equal to or less than two), the address used to conference between nodes may be identical to the node's IP address on the messaging layer 16. When two or more nodes are conferencing, IP multicast addresses may be used. In this case, it is necessary for the conference configuration cell 22 to identify the addresses of the data streams for each node 10 and then to instruct the network interface processor to "listen" to those addresses to obtain the information from the data transmission layer 14. Regardless of the delivery mechanism employed on the transport layer, once the information is available to each node, it is processed by the A/V/D cells 18 and displayed as the conferee that the node has specified. This is to be compared with prior art video communications systems where all information from a given node had to be assembled by that node or by a server/host/master in a manner that was appropriate for each receiving node and separately transmitted to that node. The present system substantially eliminates the need for a such client/server or master/slave operation.

A further aspect of the system of FIG. 1, which will be described in more detail hereinbelow, is that each node 10 has the ability to independently determine the makeup of the conference at that node. Since all conferees are provided with information as to whom the other conferees are, and since each conferee has independent access to the audio and video streams 20 from each other conferee's node, each individual conferee can determine what or whom they wish to view or hear and configure their conference accordingly. In the present system there is, therefore, no reason that any two conferees must view the conference in exactly the same manner. This is, again, different from prior art, which offered the individual conferee little or no such control.

Another feature of the system in FIG. 1, is that each system operates asynchronously and simultaneously with respect to the other systems. This asynchronous operation is defined in the "connectionless" protocols whereby the nodes retrieve information in the form of a stream of data (either audio and/or video) from the data transmission layer 14 at an unspecified rate. The transmitting system places the information onto the data transmission layer 14 at a given rate, which rate is a function of the particular hardware utilized at the transmitting node and other parameters. By comparison, the receiver may have different hardware and may not have the ability to accept information at the same rate that it is being placed onto the network. Because there is no interlocked "handshaking" between the transmitting and the receiving nodes, the receiving node does not have to receive data as fast as it is being transmitted. As noted in the description of system fault tolerance, specific provision is made in the current system to manage missing and/or disordered audio or video data in. a fashion that minimizes the impact of such loss at the receiving node. The practical effect of this is that the present system provides simultaneous multi-directional data streaming as multiple users prepare and receive data during conferencing.

In yet another aspect of the system in FIG. 1, each of the nodes may select its own compression factors on its outgoing data. Further, each node may transmit data at different frame rates and with different video formats (PAL or NTSC). Receiving nodes are enabled to process a plurality of incoming data streams at different levels of compression as well as at differing speeds and characteristics. Finally, through the addition of specialized hardware, each of the nodes 10 may also accept incoming information in other protocols than the IP protocols and translate this data to IP protocol data that can be managed over the network. In brief, FIG. 1 depicts a system wherein information may be interchanged between multiple nodes wherein each node may have wholly different characteristics, both in terms of the characteristics of its outgoing data and in terms of the management and display of the incoming information.

Conference Architecture: General Communications Structure

Referring now to FIG. 2, there is illustrated a more detailed block diagram of a number of nodes in the system. The nodes are labeled node A 56, node B 58 and node N 62. These nodes are identical to the nodes 10 of FIG. 1. Each of the nodes has associated therewith a network cell or cells 26, which are operable to receive information from the A/V/D cells 18 or the configuration cells 22 and transmit the information to another node via either the messaging layer 16 or the data transmission layer 14, as specified by the cell requesting the information transfer.

Each of the nodes also has associated therewith a network interface processor (typically a "NIC," a network interface card) 32 that interfaces with the physical layer of the network to receive and send information. When handling UDP data, the network interface processor 32 simply accesses those messages associated with the node's own IP address. When instructed to handle multicast data, the network interface processor 32 has the ability to obtain all necessary information from the network by accessing messages with the appropriate multicast addresses. The address from which information is to be obtained is provided to the network interface processor 32 through the network cell(s) 26 by the cell that wishes to obtain or send information. The network interface processor 32 and the network cells 26 function together to remove the headers added at the transport, internet and physical layers and to transfer the incoming data to the control of the requesting cell.

As noted earlier, it is up to the conferee to determine which information is to be viewed and heard and to determine how it is to be displayed. The conferee may not wish to obtain all of the information that is part of a single conference. For instance, in a video conference with a large number of participants, the conferee may wish to hear all of the participants, but to simplify their display by viewing only one or two of the participants. In this case, the user may configure the audio and video cells 18 so as to cause them to obtain all of the audio streams, but only some of the video streams.

The audio cells, as previously described, process the multiple incoming audio streams that are then merged and played back on the conferee's audio output device. The video cells process the incoming video streams and output them to the appropriate video memory locations for transfer to the conferee's display unit. This process is described in more detail hereinbelow.

It can be seen from FIG. 2 that each of the conference configuration cells 22 is functional to interface through the messaging layer 16 with the other nodes in the system to configure and control their interaction. For example, if node A 56 wanted to enter into a conference with node N 62, it would send a message to node N 62, asking node N 62 to be in the conference. Node N 62 would reply that it would like to join the conference and send sufficient information to node A 56 that the two nodes (node A 56 and node N 62) could populate their internal address tables 36, create the appropriate audio, video and network cells 18, 26 and commence conferencing.

Both node A 56 and node N 62 would then have knowledge of the addresses on the data transmission layer 14 necessary for their conference. If a third node, node B 58, were subsequently to enter the conference, the preferred embodiment would allow the entry of node B 58 by either of two methods. In the first case, one of the already-conferencing nodes, node A 56 or node N 62, would initiate contact with node B 58. In the second case, node B 58 would contact either node A 56 or node N 62. In either case, a conference request is generated and accepted. Node B 58 supplies its conferencing addresses and it interacts with the node that it has contacted to allow it to create the necessary cells and to create and propagate address tables 36 so that all of the nodes already in the conference can be updated with the addresses of the new nodes.

In this manner, once a conference is set up, any node (including the nodes that started the conference) may leave the conference, join other participants in the conference or transfer their session to yet another node. If it is a node that is not already in the conference, it may request to join itself to the conference. This differs from prior art video conferencing architecture in which an outside node (possibly with the exception of the master system operator) has no ability to initiate a join to an inprocess conference.

The joining, subtraction and transferring of nodes require no action on the part of the other nodes, except the acceptance and updating of their conference tables and the creation or destruction of the processing cells 18, 26 as needed to handle the changing data streams. Each of the nodes independently configures itself and is not dependent on any other node for configuration or processing instructions except inasmuch as that other node may change the characteristics of its own data transmission.

Conference Architecture: Non-secured Joined Multi-party Conference

Referring now to FIG. 3, there is illustrated a detailed block diagram of one of the nodes 10. The node 10 illustrated in detail is labeled node N and is shown in conference with nodes B, C and D. Node A 56 is transmitting audio and video to the multicast addresses on the data transmission layer that are designated as addresses 252. Node B 58 is transmitting audio and video to the addresses on the data transmission layer that are designed as addresses 254. Node C is transmitting audio and video to the addresses on the data transmission layer that are designated as addresses 258. An individual network cell 26 has been created for each address and is associated with a given process cell 42, 46. The network interface processor 32 is instructed by the network cells 26 of node N to obtain information from the data transmission layer addresses of those particular three conferees.

There is a receiving audio cell 42 active on the user's node for each address on the data transmission layer. This cell 42 is operable to utilize its associated network cell 26 to receive the audio from the address 252, 254 or 258 on the data transmission layer 14 where the other node has placed it, to process the audio data and play it back on a line 44 to a speaker or some other sort of audio output device. Multiple audio cells may simultaneously be in operation, each delivering audio data to the hardware 44 that manages sound processing.

There is also a receiving video cell 46 which is operable to utilize its network cell 26 to receive data from the address 252, 254 or 258 on the data transmission layer 14 with which it is associated. It manages the processing of the data and delivers the converted video data to the user's display 34. Multiple video cells may simultaneously be in operation, each delivering video data to the hardware 34 that manages display processing.

Local audio and video are handled in specialized cells 52, 50. These cells, which are described in more detail hereinbelow, are operable to receive the audio and video data from the local input devices, which data is encoded in such a manner that it is ready for transmission. The purpose of such encoding is to reduce the amount of bandwidth that is needed for the transmission of the data on the network by compressing the data. The output of the local audio 52 and video 50 processing cells is transferred through the network cell(s) 26 and the network interface processor 32 to the addresses on the data transmission layer 250 that have been obtained by that node as the locations for the audio and video transmission. Uncompressed local video is also routed for display on the user's own display as a "self-view" image.

Conference Architecture: Secured Joined Multi-party Conference

Figure 4:
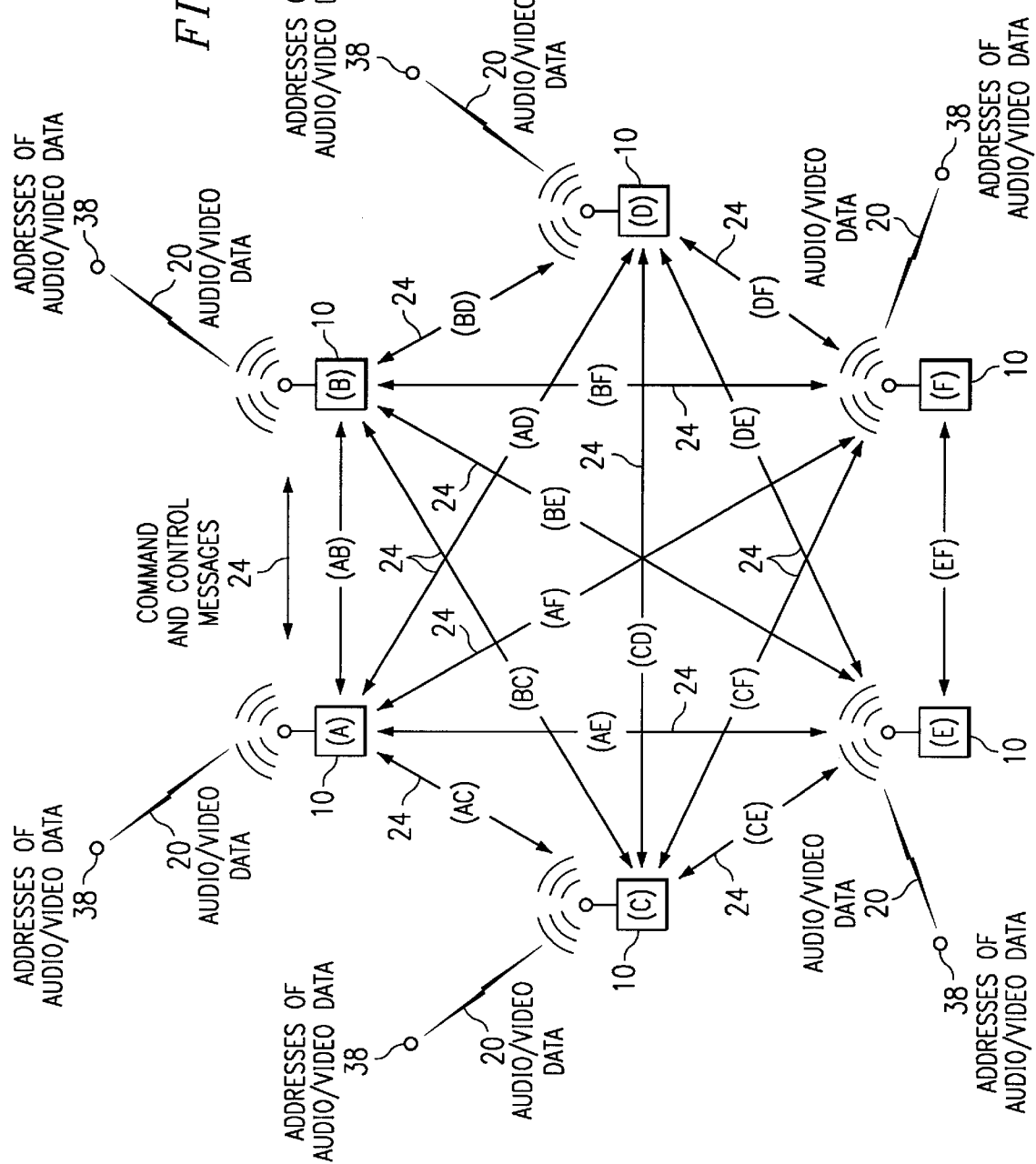
FIG. 4 illustrates the architecture of the architecture of a secure, joined, multi-party conference.

Referring now to FIG. 4, there is illustrated an alternate application of the conferencing network of the present system. In this mode, there is provided a secured version of the conferencing architecture. In this application, there are provided a plurality of nodes, herein represented by six nodes. These six nodes, which are identical to the nodes 10 of FIG. 1, are joined in a conference; they exchange command and control information 24 over the messaging layer 16 and each transmits its own audio and video data 20 to its addresses on the data transmission layer 38 from which location the other nodes retrieve it. It should be noted that the conference configuration cell 22 of every node can exchange data with the conference configuration cell 22 of every other node through the messaging layer 16. This is normally used, as described hereinabove, for the exchange of conference command and control information. In secured mode, however, a variety of techniques are used to encrypt or control access to information on the data transmission layer and the information necessary to maintain that control is exchanged by the nodes on the messaging layer 16 and stored in each node's conference control tables.

During session initiation, when the addresses of the data streams are being exchanged, the nodes may encrypt this information. For additional security, the addresses of the audio and video data streams on the data transmission layer 38 may be dynamically changed during the conference. In this case, additional encrypted address information may be exchanged between the nodes over the messaging layer 16 during the conference as part of the address reallocation process.

As a further security precaution, the data streams on the transmission layer 20 may be encrypted or otherwise secured and the security keys and the encryption/decryption instructions separately transmitted over the messaging layer 16.

Conference Architecture: Non-secured Broadcast

Figure 5:
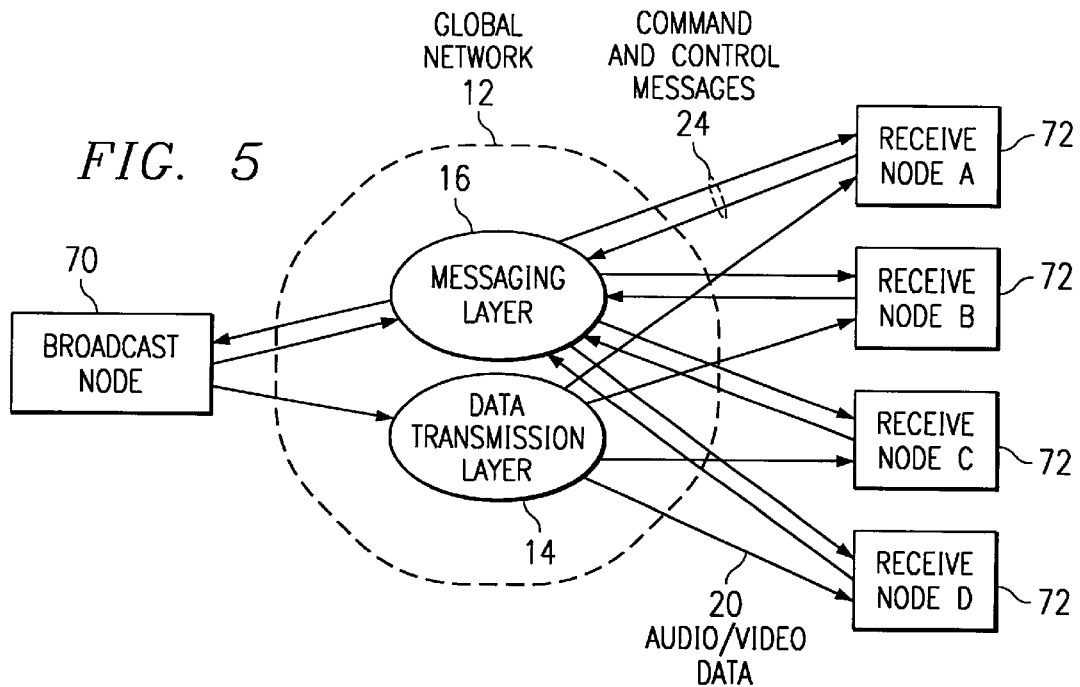
FIG. 5 illustrates a diagrammatic view of the architecture of a non-secured broadcast application of the present invention.

Referring now to FIG. 5, there is illustrated a diagrammatic view of a broadcast application of the present system. This involves the use of the present system for non-joined, one-way transmission ("broadcast"). In this mode, the various nodes are divided into a single broadcast node 70 and a plurality of receiving nodes 72. Each of the nodes 70 and 72 are identical to the nodes 10 in FIG. 1 in that they all have the capability to enter into standard video conferences in accordance with the operation of the system described herein. In this mode, however, one node ("the broadcast node") 70 is configured such that it transmits data to its audio and video addresses on the data transmission layer 14, but does not create network cells to retrieve any information from any other node. To become a broadcast node, the node obtains its multicast addresses on the data transmission layer as described hereinabove, defines itself as a broadcast node and commences transmitting its audio and video data to its addresses on the data transmission layer 14. Any node that wishes to receive the broadcast can obtain the addresses of the broadcast by communicating through the messaging layer 16 with the broadcast node.

After receiving the data from the multicast addresses of the broadcast node, the receiving nodes 72 then create the audio, video and network cells needed to receive and display the broadcast information. In this application, the receiving nodes do not need to send audio and video data, as neither the broadcast node 70 nor any other node needs this information. As a result, the receiving cells do not obtain multicast addresses on the data transmission layer 14 nor do they transmit data to these addresses.

It is possible for a receiving node 72 to monitor a number of broadcast channels. For example, there could be a number of broadcast nodes 70, each transmitting audio and video information. A receiving node 72 could actually receive multiple broadcast stations 70, display video from all of those stations and allow the user to specify the one to which they wish to listen. This is very similar to the feature whereby multiple sports channels can be viewed at the same time on the same television screen, but the audio of only one channel is played.

Conference Architecture: Secured Broadcast

Figure 6:
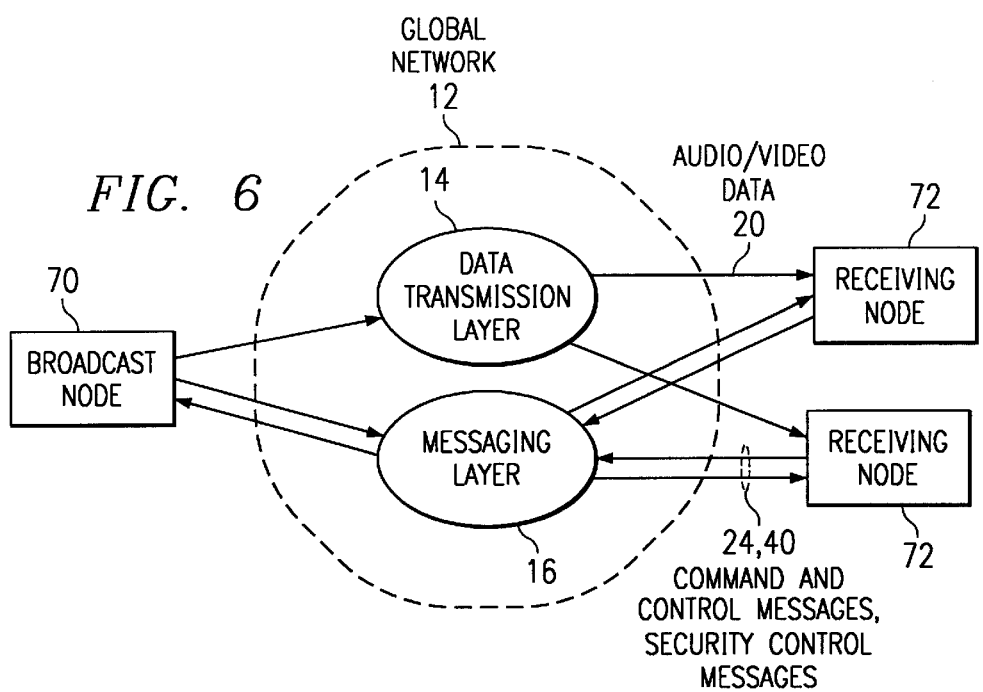
FIG. 6 illustrates a diagrammatic view of the architecture of a secure broadcast application of the present invention.

Referring now to FIG. 6, there is illustrated a diagrammatic view of another application of the present system. This configuration provides a secure mode none-joined, one-way transmission (broadcast). In this application, in addition to the information normally exchanged for control purposes, the messaging layer 16 is also utilized to transfer information that is used to secure the data on the data transmission layer 14. There are provided three nodes, a broadcast node 70 and two receiving nodes 72, disposed about the network 12 and interfacing with each other through the messaging layer 16. These nodes are identical to the nodes 10 in FIG. 1. All nodes are equally enabled to receive and transmit data.

In this mode, one node (the "broadcast node", 70 is configured such that it will transmit data to its audio and video addresses on the data transmission layer 14, but will not use its network cells to retrieve any information from any other node. To become a broadcast node, the node obtains its addresses on the data transmission layer as described hereinabove, defines itself as a broadcast node and commences transmitting its audio and video data to its addresses on the data transmission layer 14. Any node that wishes to receive the broadcast can obtain the addresses of the broadcast by communicating through the messaging layer 16 with the broadcast node.

During session initiation, when the addresses of the data streams are being exchanged, the nodes may encrypt this information 40. For additional security, the addresses of the audio and video data streams on the data transmission layer 14 may be dynamically changed during the conference. In this case, additional encrypted address information may be exchanged between the nodes over the messaging layer 16 during the conference as part of the address reallocation process. The receiving nodes 72 then create audio, video and network cells 26 to receive and display the broadcast information. In this structure, the receiving nodes do not need to send audio and video data, as neither the broadcast node 70 nor any other node needs this information. As a result, the receiving cells do not obtain addresses on the data transmission layer 14 nor do they transmit data to these addresses. As a further security precaution, the data streams on the transmission layer 14 may be encrypted or otherwise secured and the security keys and the encryption/decryption instructions separately transmitted over the messaging layer 16.

Conference Architecture: Disjunctive Multi-party Conference

Figure 7:
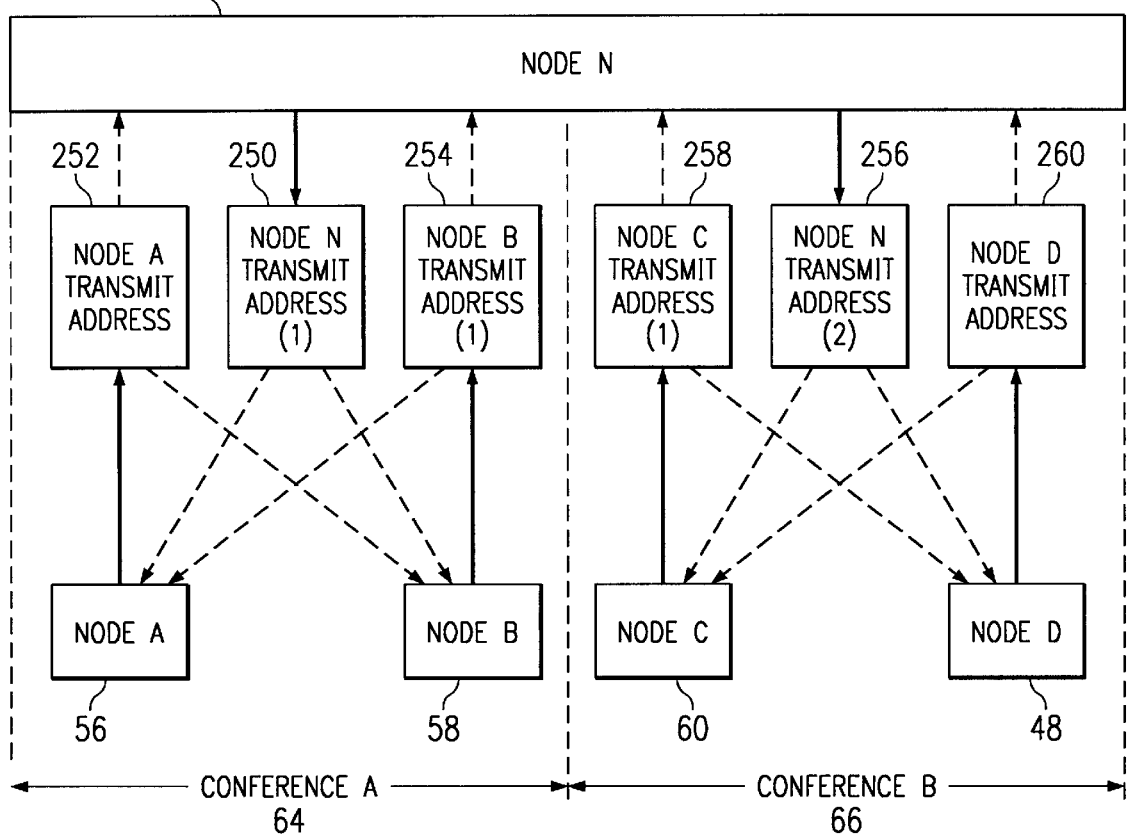
FIG. 7 illustrates a diagrammatic view of the architecture of a disjunctive, multi-party application of the present invention.

Referring now to FIG. 7, there is illustrated a diagrammatic view of two conferences, conference A 64 and conference B 66. Each conference is composed of multiple nodes. These nodes are identical to the nodes 10 of FIG. 1. The users at nodes A 56 and B 58 have knowledge of each other as well as node N 62 and are, thus, participating in a logically joined conference (Conference A, 64). The users at nodes C 60 and D 48 have knowledge of each other, as well as node N 62 and are also participating in a logically joined conference (Conference B, 66). The two conferences are fundamentally disjunctive; participants in conference A 64 have no knowledge of conference B 66 and vice versa.

At node N 62, the conference control tables contain the addresses of nodes A, B, C, D and N (itself). However, to keep the participants in conference A 64 from hearing or seeing node N's comments that pertain to the other conference, the user at node N 62 must manage their outgoing audio and video such that the two conferences remain separate. This is accomplished by allowing node N to obtain more than one set of addresses on the data transmission layer 14 and to represent itself to each conference separately by using the different addresses 250, 256. The user at node N uses the normal features for outgoing audio and video control (mute/on) to prevent transmitting unwanted audio or video to either of the conferences.

Figure 8:
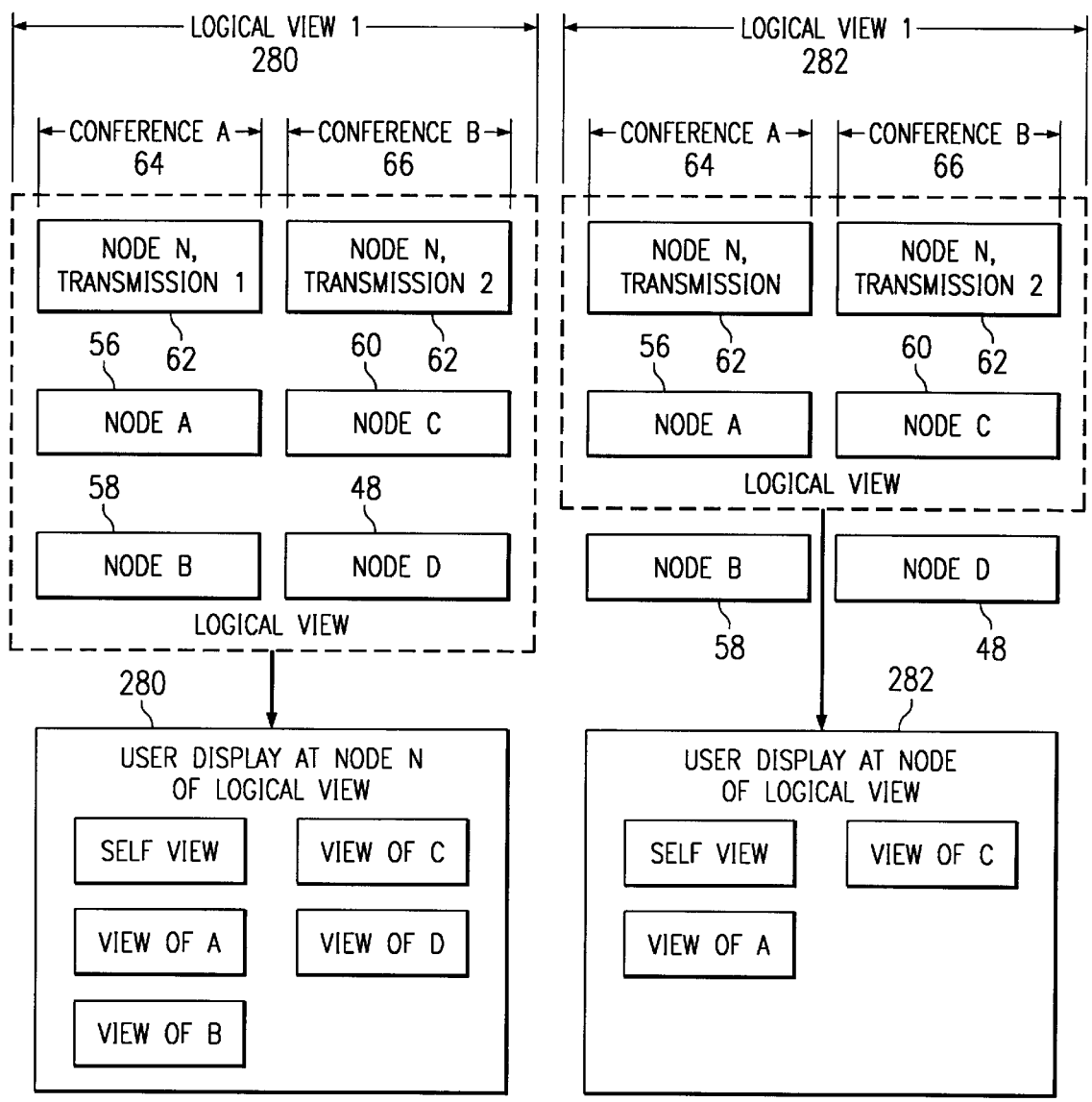
FIG. 8 illustrates the conferee's view of a disjunctive, multi-party application of the present invention.

Referring now to FIG. 8, there is illustrated a block diagram of a configured conference that illustrates the versatility of the present system. In this example, the user is participating in both joined and non-joined conferences. These may be either one-way (broadcast) or multi-way conferences. This figure demonstrates the situation from the user's point of view. In this configuration, it can be seen that the illustrated node has knowledge of two separate (non-joined) conferences: conference A 64 and conference B 66, each of which consists of three conferees. Conference A consists of nodes N, A and B, while conference B consists of nodes N, C and D. The user, once the conferences have been established, can then decide whether to display all members of all conferences, all members of any specific conference or any member of any conference. The node has access to all of the information generated by all of the conferees in each of the conferences, since all of the information exists on the data transmission layer.

FIG. 8 illustrates a case in which the user of the system has configured their node such that they are displaying (in view 1, 280) all the conferees in all the conferences. In the second configuration (view 2, 282), they are displaying one conferee from each of the two conferences, thus effectively putting the user of node N 62 in the position of monitoring multiple in-process conferences. The user's audio cells are configurable to allow the user to select the audio streams that should be played back on the user's audio output device.

There are many practical applications of this type of system. Among these:

1. an application that allows a system administrator to monitor all conferences, switching the output audio from one conference to the other or even listening simultaneously to selected speakers in each of the conferences;
2. an application in a distance learning situation where one conference is used for a teacher to instruct a class while another is used by the participants in the class or by external observers to comment on the presentation;
3. an application where one conference is used for broadcast data (such as stock ticker information), while other conferences are used for simultaneous conferencing;
4. an application in which one channel is used for a live information feed, while another user on another node creates simultaneous commentary, the combination of which may be viewed or heard by other nodes as a single event.

These applications derive from the features of the present system that allow the user to separately control the output audio and video in respect to every other node, to participate in both joined and non-joined conferences and to utilize the present system for both two-way and broadcast use.

Conference Architecture: Disjunctive Overlapping Conferences

Figure 9:
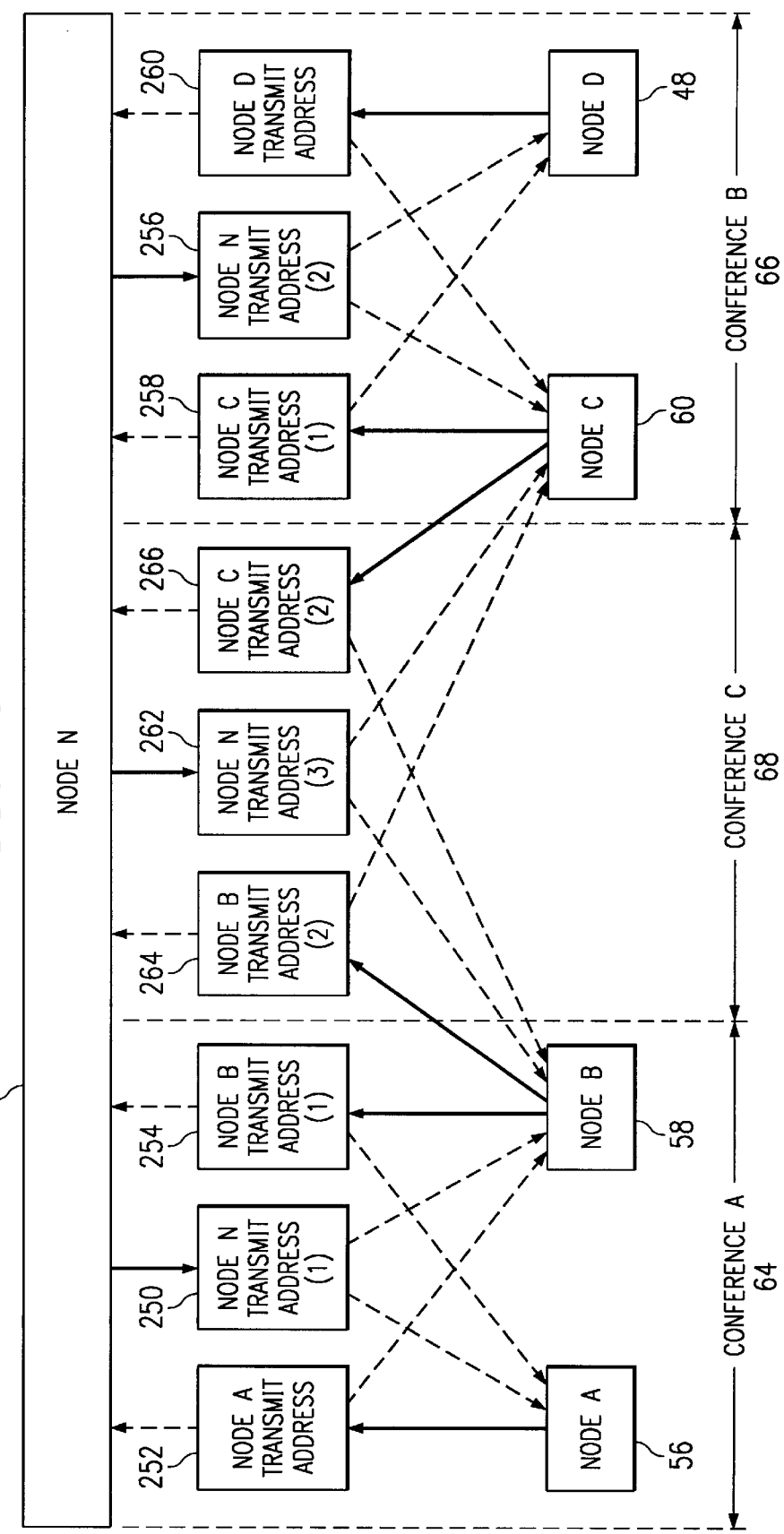
FIG. 9 illustrates a diagrammatic view of the architecture of a set of disjunctive, overlapping conferences.

Referring now to FIG. 9, there is illustrated a diagrammatic view of disjunctive overlapping conferences. As illustrated in FIG. 9, the features described hereinabove with reference to FIG. 7 that support separate disjunctive conferences also introduce the possibility of overlapping disjunctive conferences where the set of the participants of one conference may subset or overlap the set of the participants of another active non-joined conference. The user of node N 62 is involved in two disjunctive conferences, Conference A and Conference B. Conference A 64 involves the users at node N 62, node A 56 and node B 58. Conference B 66 involves users at node N 62, node C 60 and node D 48. Node N has obtained two sets of multicast addresses on the data transmission layer 250 and 256 for this purpose.

If it were so desired, the user at node N could create yet another conference, which consists of a separate conference involving the users of node B 58 and node C 60. This is logically analogous to the physical situation of participating in several conversations at once. It is likely, therefore, that the participation of users B, C and N in the original conferences will be affected by their membership in the secondary conference and it is, furthermore, unlikely that the other participants in the original conferences would fail to notice such dual participation. However, the feature is supported and the interaction is permitted.

Thus, in addition to the features described hereinabove with respect to FIG. 7, whereby user at node N has control over the incoming data such that the node can display all or any combination of the data streams, the node also has the ability to control outgoing video and audio.

Procedural flow: Conference Initiation (Joined Conference)

Figure 10:
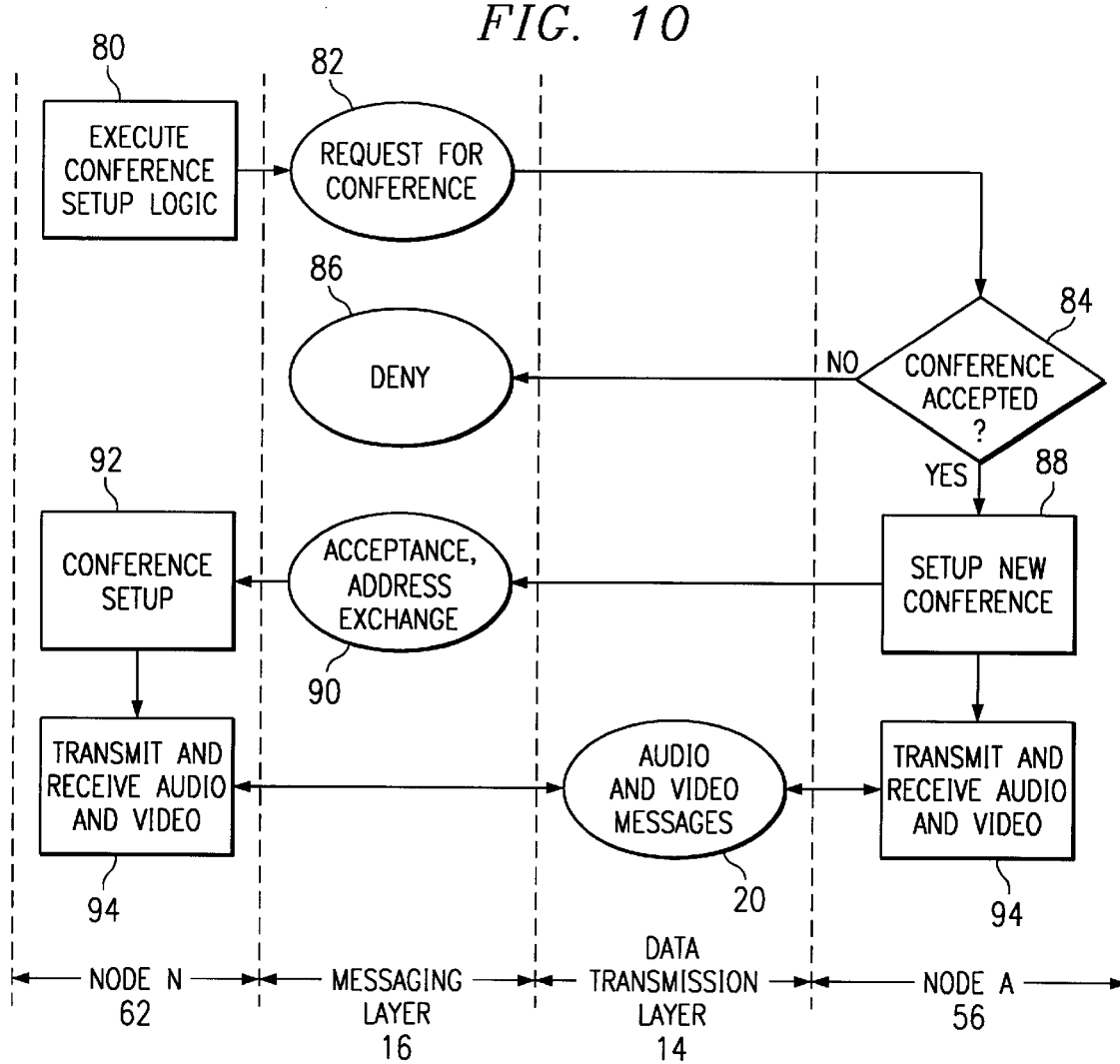
FIG. 10 illustrates a flowchart that depicts the process of initiating a simple joined conference.

Referring now to FIG. 10, there is illustrated a flowchart depicting the processing steps that must be executed to start a conference where no conference previously exists. In this illustration, it is to be understood that the nodes are identical to the nodes 10 in FIG. 1. When no conference is taking place, the present system rests in a wait state on the node, utilizing minimal system resources. When the user of the node N 62 desires to initiate a conference with node A 56, a process is launched whereby:

1. the user of node N 62 indicates the node (node A 56 in the example) with which the conference is to be initiated. As a result, node N 62 obtains a set of addresses on the data transmission layer that it will use for audio and video data transmission as indicated by a block 80;
2. Node N 62 exchanges a series of messages as indicated by a block 82 with node A 56, identifying itself, authenticating the connection and requesting a conference. At the end of this exchange, a message is sent that contains the addresses on the data transmission layer 14 that node N 62 will use for its audio and video data transmission;
3. there are a number of reasons why node A 56 may not be able to conference; it may be off-line, it may not have the application enabled, it may be set by its user in do-not-disturb (DND) state, the user may be busy, may not be available to answer the call or may not wish to answer the call. In all of these cases, the connection acceptance validation fails as indicated by a block 84 and the user of node N 62 is notified as indicated by a block 86 that the conference will not take place;
4. if node A 56 wishes to accept the call, it also obtains addresses on the data transmission layer 14, updates its conference table and creates audio and video data cells that are bound to network cells that are uniquely associated with the addresses of node N 62. These are immediately operable to retrieve the information from the data transmission layer 14.
5. Node A 56 passes the addresses as indicated by a block 90 that it will use on the data transmission layer 14 through the messaging layer 16 to node N 62;
6. Node N 62 updates its conference table as indicated by a block 92, such that it now contains both its own addresses and those of node A 56 and creates audio and video data cells that are bound to network cells that are uniquely associated with the addresses of node A 56. These are immediately operable to retrieve the information from the data transmission layer 14.
7. Both nodes now start transmitting 94 audio and video data 20 to their transmission addresses on the data transmission layer, as indicated by block 94.

As noted hereinabove, each node configures its own conference; the appearance and content are totally Linder the control of that node. While all audio and video cells initially launch active windows, these can be tailored by the user to meet their own requirements: deactivated, sized, muted or otherwise manipulated.

Procedural flow: Node Addition to Joined Conference

Figure 11:
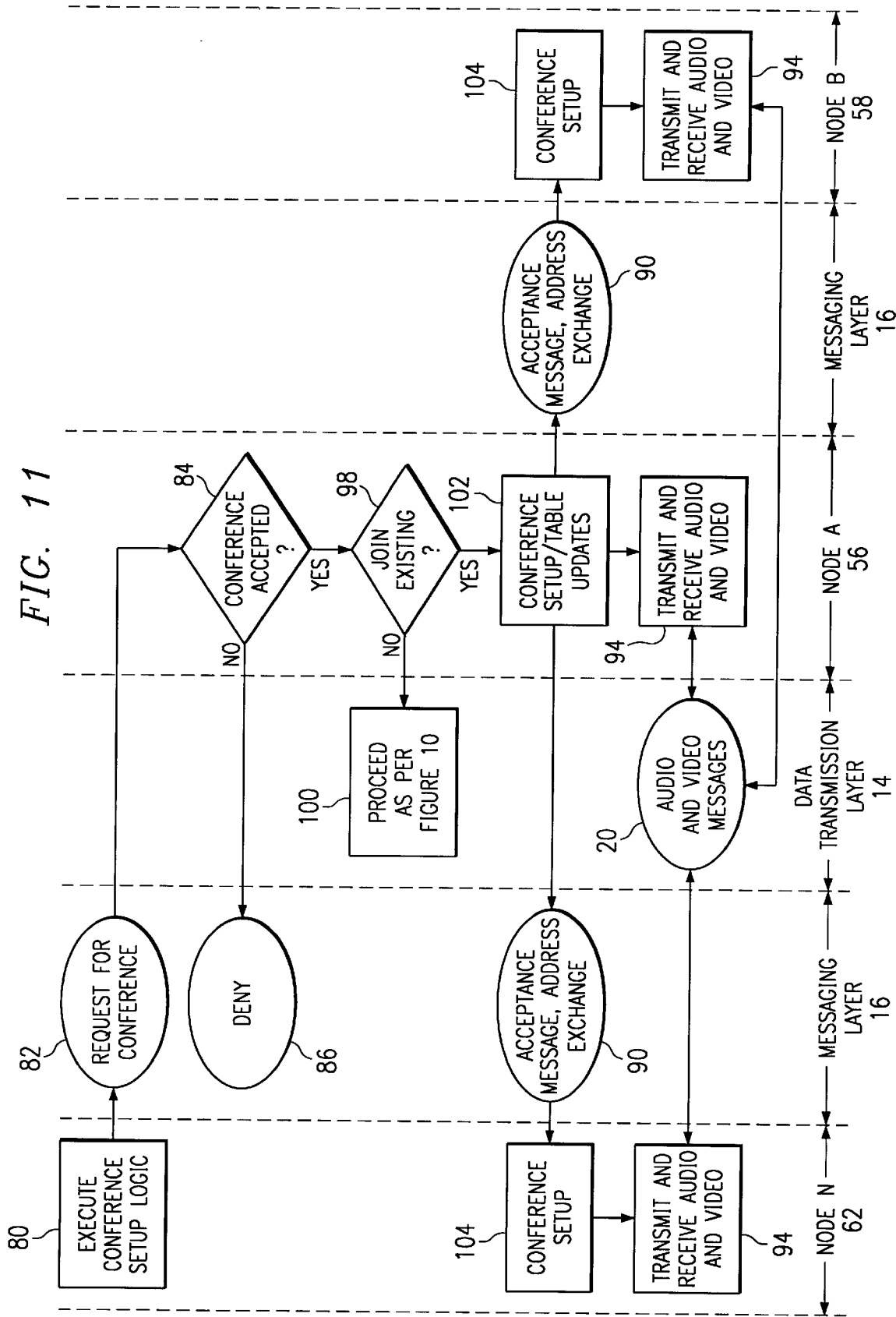
FIG. 11 illustrates a flowchart that depicts the process of joining a node to an existing joined conference.

Referring now to FIG. 11, there is illustrated a flowchart depicting the flow of program control during the addition of a conferee to an existing conference. The nodes in the conference are labeled node A 56 and node B 58. The joining node is labeled node N62. These nodes are identical to the nodes 10 in FIG. 1.

On both sides of the conference, the nodes must maintain the knowledge of the conference in its entirety as described by the combination of the multicast addresses of the participants, this defining a logical group. The purpose of this is to ensure that when another conferee is added, each node can update the tables that describe the conference in the logical group for that node such that (a) the existing conferees can receive notice of the new conferee and (b) the new conferee can receive notice of the existing conferees in the logical group. This process is described in more detail hereinbelow.

Figure 12:
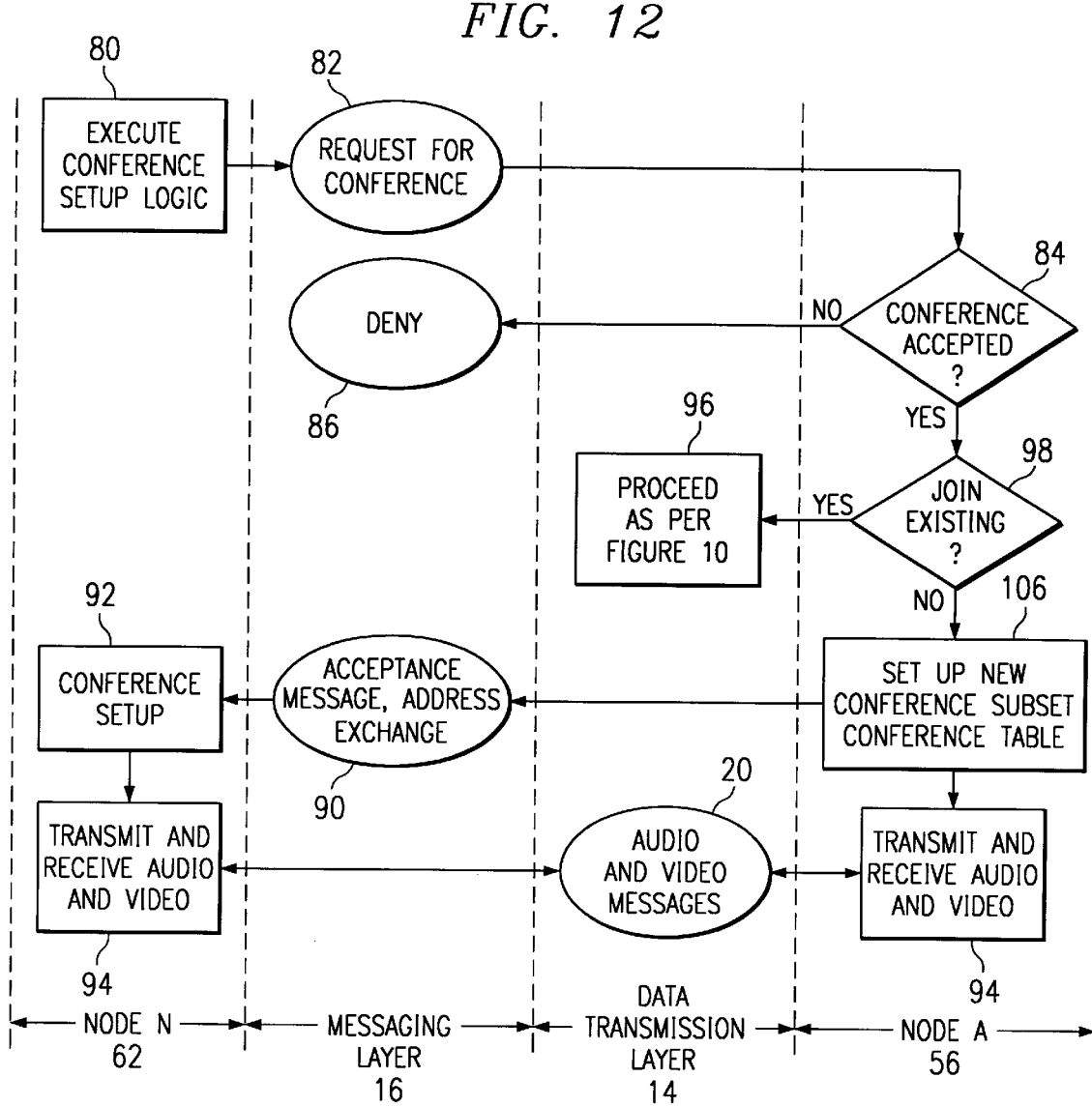
FIG. 12 illustrates a flowchart that depicts the process of initiating a disjunctive conference.

When the user of the node N 62 desires to join an existing conference in which node A 56 and node B are already participants, a process is launched whereby:

1. the user of node N 62 indicates the node (node A 56 in the example) with which the conference is to be initiated and node N 62 obtains the addresses that it will use for audio and video data transmission, as indicated by a block 80;
2. Node N 62 exchanges a series of messages, as indicated by a block 82, with node A 56, identifying itself, authenticating the connection and requesting a conference. At the end of this exchange, a message is sent to node A 56 that contains the addresses on the data transmission layer 14 that node N 62 will use for its audio and video data transmission;
3. there are a number of reasons why node A 56 may not be able to conference; it may be off-line, it may not have the application enabled, it may be set by its user in do-not-disturb (DND) state, the user may be busy, may not be available to answer the call or may not wish to answer the call. In all of these cases, the connection request is rejected, as indicated by a block 84, and the user of node N 62 is notified that the conference cannot proceed, as indicated by a block 86;
4. Since node A 56 is already in conference, it already has a set of addresses on the data transmission layer 14 and is transmitting its audio and video data streams to those addresses, as indicated by a block 96. If the user at node A 56 does not wish to reject the conference from node N 62, the user at node A 56 must determine whether node N 62 should join an existing conference or be in a separate, disjoined conference. This choice is indicated by the execution of a "JOIN" operation 98 at node A 56 when the audio and video cells for node N 62 are created at node A 56.
5. If the user at node A 56 determined that node N 62 should not join the existing conference, the procedural control flow continues as indicated in FIG. 12.
6. If node N 62 is joining an existing conference, node A 56 simply updates its conference table with the addresses of node N 62, and sends the updated conference table to node N 62 (the joining node) and to all other nodes in the conference (in this illustration, node B 59).
7. All nodes update their conference tables, as indicated by a block 102, create the necessary audio, video and network cells, notify their user(s) that there is a new participant and allow their user to configure the data streams from the new conferee as they may wish. It is noted that the set of addresses that define a conference and the conferees therein define the logical group and must be available by all conferees in a conference.

However, if a node alters this set of addresses at its location, this will constitute a "local group," which set of addresses are not available to the conferees in the logical group.

8. Node N starts transmitting its audio and video data 20 to the data transmission layer and conferencing commences, as indicated by a block 94.

Once the information is transmitted to all the conferees in the conference, the initiator has relinquished control of the conference, and any conferee in the conference can now initiate the addition of another conferee.

Procedural flow: Conference Initiation (Disjunctive Conference)

In most cases, a node will only participate in a single conference at a time. However, there is a possibility that multiple nodes may participate simultaneously in separate and non-overlapping ("disjunctive") conferences. This situation arises when a participant in an existing conference makes a connection with a new conferee but does not join them to the existing conference. In this situation, the nodes must exchange only subsets of the conference configuration tables. This is illustrated in FIG. 12, which is an expansion of the situation depicted in FIG. 11.

When the user of the node N 62 desires to join an existing conference in which node A 56 is already a participant:

1. the procedural flow, as indicated by a blocks 80 and 84, is identical to the procedural handling of a joined conference in FIG. 11 until the point is reached, as indicated by a block 98, where the user of node A 56 determines that node N 62 is not to be joined to the existing conference 96 but remain a separate (disjunctive) conference 106.

2. Node A 56 then obtains a second set of addresses on the data transmission layer 14 and creates a conference sub-table, which contains the addresses of node N 62 and those of node A 56. The purpose of having different transmissions is to allow the conferee at the node to selectively mute the outgoing audio and/or video data streams to either of the conferences.

3. Node A 56 sends a conference acceptance message 90 through the messaging layer 16 to node N 62. This includes the addresses that node A 56 will use on the data transmission layer 14.

4. Node N 62 generates a conference table that consists of both its own addresses and those of node A 56 and launches the audio, video and network cells that are bound to node A's addresses 92.

5. Node A 56 begins transmitting 94, audio and video data, as indicated by a block 20, to the new addresses on the data transmission layer 14. The transmission is identical to the data transmission going to the other addresses on the data transmission layer 14 until the user at node A changes it in some manner.

6. Node N 62 now starts transmitting audio and video data, as indicated by a block 20, on the data transmission layer 14.

This feature allows users to have separate, simultaneous conferences.

Procedural flow: Conference Join of Disjunctive Conferences

Referring now to FIG. 13, there is illustrated a flowchart for joining disjunctive conferences. On occasion, a need arises where it is desirable to join two previously non-joined conferences. This action may be undertaken by any user who is a member of both conferences. In this illustration, node N is considered to be a member of two disjunctive conferences, Conference A and Conference B. Upon execution of the "JOIN" request, the following actions take place:

1. Node N 62 is transmitting data and video on to conference A 64 using one transmitting address 250 and is also transmitting data and video to Conference B 66 on a separate address 256.

2. the user at node N determines that the two conferences should be joined;

3. The conference configuration cell of node N 62 examines at a block 270 the sub-tables within the conference address table 36 to determine which of the two conferences has the fewest members (for the purpose of illustration, this is considered to be conference A);

4. Node N 62 updates its own addresses 272 in the conference sub-table that describes conference A to contain, instead, the addresses on the data transmission layer that it is utilizing for conference B.

5. Node N 62 creates at a block 274 a transaction 278 on the messaging layer to all members of conference A and conference B that contains the updated address table and join instructions.

6. All members of conference A update their tables 102 and, for purposes of obtaining the video and audio of node N 62, utilize the updated addresses that were sent in the conference table. These are the addresses that node N was formerly using only with the members of conference B 256 plus the addresses of all the members of conference B.

7. All members of conference B update their tables at a block 102 to contain the new members of the conference (formerly members of the non-joined conference A).

8. All users in the conference configure their displays as they may wish to display the information from the additional sessions, as indicated in block 94.

9. Node N 62 ceases transmitting, as indicated by block 276, audio and video data on the addresses that it had originally obtained for use during conference A 276.

Procedural flow: Conference Termination

Figure 14:
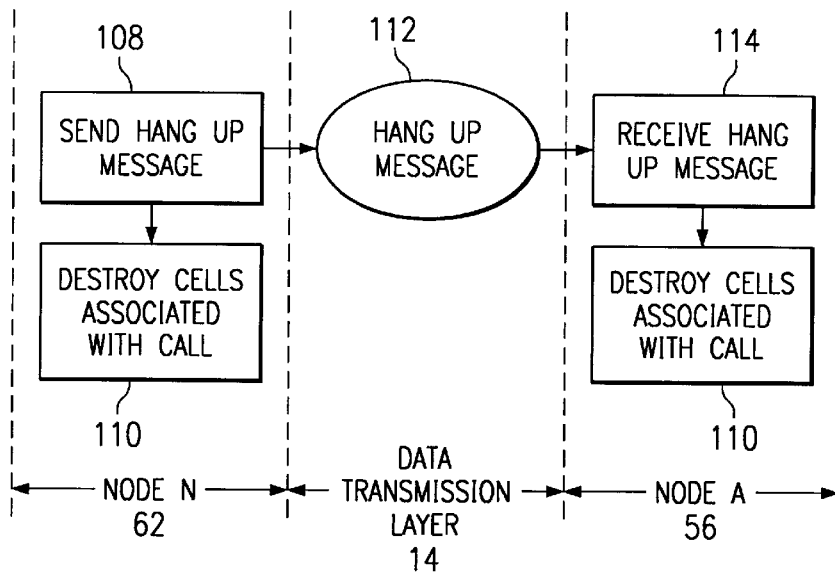
FIG. 14 illustrates a flowchart depicting the process of terminating a conference.

Referring now to FIG. 14, there is illustrated a flowchart depicting the operation of dropping a conferee. When a node determines that it wishes to leave a conference, it performs the following actions:

1. In a block 108, a "hang up" message 112 is sent that notifies all other conferees that it is going to drop from the conference;

2. it destroys, as indicated by a block 110, the audio, video and network cells that it was using to transmit information to the addresses on the data transmission layer 14;

3. as indicated in a block 1 14, upon receipt of the hang-up message 112, the other nodes destroy, as indicated by a block 110, the cells that they were using to receive data from the node and perform any housekeeping actions necessary to release resources to other processes.

If the number of conferees in the conference is now equal to one, the conference is considered to be terminated in its entirety.

Processing Overview: Local Audio and Video Capture and Processing

Referring back to FIG. 3, there is illustrated a block diagram of the local audio and video cells. These cells manage the processing that converts the raw analog video and audio information to a format suitable for transmission.

These cells are constructed differently from the receiving audio and video cells that manage the incoming audio and video data streams from the network. These cells are unique and are created as needed.

The video data processor 30 performs all of the processing necessary to convert the raw input video to a compressed digital video stream. The incoming analog video signal is initially processed through an analog-to-digital converter (not shown). The signal is then routed to two locations; to the user's self view window 40 (if one is active) and to the video encoder/decoder ("codec") portion of the video data processor 30. The video codec compresses the video data stream such that the number of bits necessary to accurately represent the video image is reduced to a fraction of the original quantity of bits. The local video cell 50 is operational to submit the compressed video stream to its associated network cell 26. This cell functions with the network interface processor 32 to transmit the data to the appropriate address 250 on the data transmission layer 14.

The user's sound card 28 performs all the processing necessary to convert the raw input analog audio to a digital data stream. The local audio cell 52 receives this data stream and submits it to its associated network cell 26 for transmission to the appropriate addresses 250 on the data transmission layer 14. Since the user can hear all sound generated at their node, there is no requirement to output audio to the local node.

The network cells 26 perform the functions necessary to prepare the data for transport and release the data to the network interface processor 32 move the data through the physical network layer.

Processing Overview: Audio Data Transmission and Reconstruction

Figure 15:
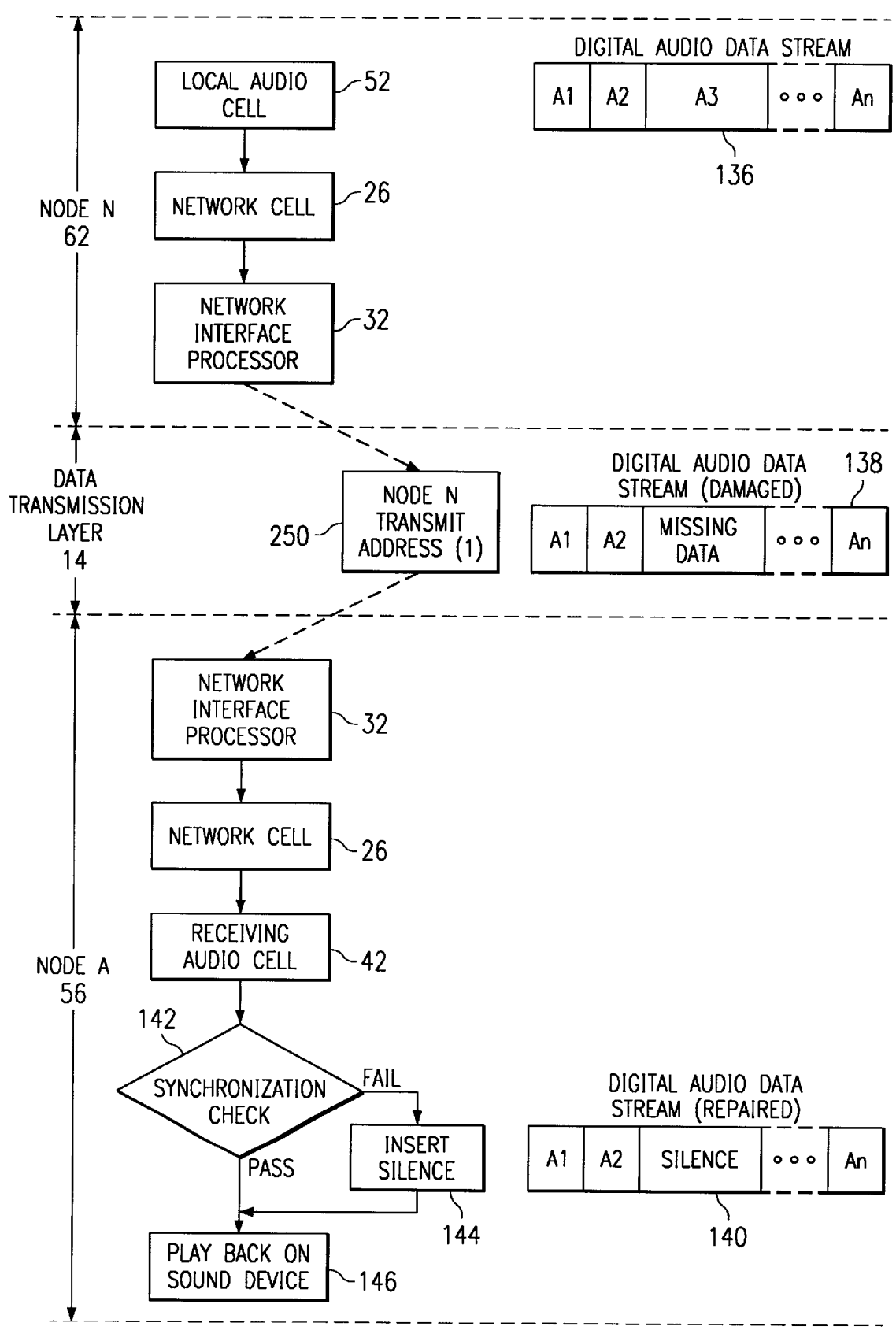
FIG. 15 illustrates a diagrammatic view of the process of audio data transmission and reconstruction.

Referring now to FIG. 15, there is illustrated a diagrammatic view of the disassembly, transmission and re-assembly of the audio data. This is illustrated as occurring between two nodes, node N 62 and node A 56, each of which is identical to the node 10 in FIG. 1.

At the node transmitting the audio and video information (node N, 62), there is provided a system clock. This system clock is operable to synchronize the generation of the video fields for a given picture and the audio data stream.

The local audio is encoded in pulse code modulation (PCM) format. This information is composed of a plurality of samples, A1, A2 . . . An 136. This constitutes a digital audio data stream that is accessed by the local audio cell 52, which combines it with time stamp data and transfers it to the associated network cell 26. The network cell, working with the network interface processor 32, as described hereinabove, segments the audio data stream data into packets, addresses it and transfers the data 136 to its associated address 250 on the data transmission layer 14.

On the receiving end (node A), the network interface processor 32 and the network cell 26 that is associated with the address of the audio data for node N 250 function together to remove the headers added at the transport, internet and physical layers and make the incoming data available to the receiving audio cell. The incoming data are the fields 126, 128 and 130 described hereinbelow with respect to the data packet format outlined in FIG. 21. This data is then transferred to the receiving audio cell 42 of node A where the data is subjected to a synchronization check 142. Synchronization checking is described in detail hereinbelow in the section entitled "AudioNideo Synchronization".

The audio cell at the receiver must obtain all packets needed to reconstruct the audio data stream. Since the architecture of the data transmission layer is unreliable by design, the receiving node must evaluate the incoming data stream to determine whether packets of data are missing or have arrived out of order. The audio cell of the receiving node evaluates the time-stamps of each audio packet in respect to the previously received packets and arranges them sequentially in a working buffer. As described hereinbelow, when a packet is determined to be missing, either by comparison with the time-stamp on a video packet or by comparison with the time-stamp on other audio packets, provision is made to compensate for the lost data.

In the example depicted in FIG. 15, during the network process on the data transmission layer 14, a portion A3 of the digital audio data stream is lost or damaged 138. When an audio packet is missing, there will be a certain amount of audio information that is not available. This would be noticeable to the user if the data were not replaced, since the absence of audio data cause the audio and video data streams to become desynchronized. As a result, when the receiving audio processing cell 42 realizes that audio data is missing, it inserts, as indicated by a block 144, as much silence into the digital audio data stream as is necessary to fill the gap of the missing data. This is illustrated in FIG. 15 where a lost sample A3 in the assembled audio stream, as indicated by a block 140, is replaced by silence. It should be understood that there will be many more samples missing when an entire audio packet is lost, but for simplicity in the illustration, only a single sample has been illustrated as being replaced by silence. The audio stream is then used, as indicated by a block 146, for mixing and playback on the local audio output device.

Processing Overview: Video Data Transmission and Reconstruction

Figure 16:
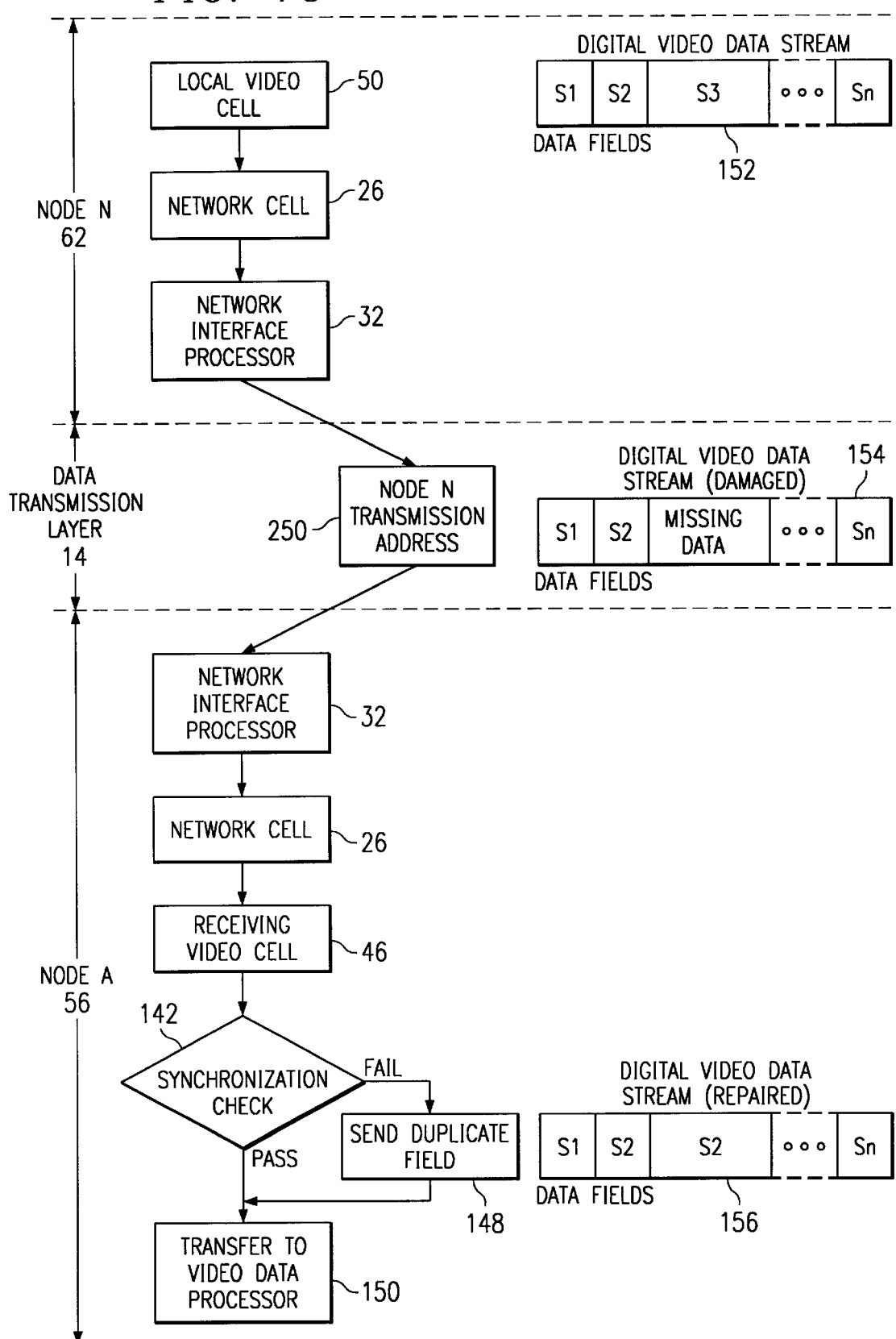
FIG. 16 illustrates a diagrammatic view of the process of video data transmission and reconstruction.

Referring now to FIG. 16, there is illustrated a block diagram of the video data processing. As described hereinabove, at the node transmitting the audio and video information (node N, 62), there is provided a system clock. The local video cell 50 of node N 62 retrieves the value of the system clock each time that it receives a field of compressed video from the video data processor. When the compressed video data is released to the control of the network cell 26, a copy of the system clock value is included as a "time stamp" that is part of the header for the data. The network interface processor 32 of node N 62 is responsible for adding the header information needed to ensure the transport of the information through the network to the correct destination address.

On the receiving end, the network interface processor 32 and the network cells 26 that are associated with the address 250 of the transmitting node function to remove the headers added at the transport, internet and physical layers and make the incoming data available to the receiving video cells 46. This data is the fields 126, 128 and 130 described hereinbelow with respect the data packet format outlined in FIG. 21. These data packets are reconstructed by the network interface processor 32 and the network cell 26 at the receiving end (node A, 56). The video cell at the receiver must obtain all the packets needed to reconstruct a single field of compressed video and reassemble these before submitting the field to the video data processor. Since the architecture of the data transmission layer is unreliable by design, the receiving node must evaluate the incoming data stream to determine whether packets of data are missing or have arrived out of order. The video cell of the receiving node evaluates the time-stamps of each video packet in respect to the previously received packets and arranges them sequentially in a working buffer. As described hereinbelow, when a packet is determined to be missing, either by comparison with the time-stamp on an audio packet or by comparison with the timestamp on other video packets, provision is made to compensate for the lost data. When a video packet is missing, it is not possible to reconstruct the field as required by the decoder. As a result, when the receiving video cell 46 realizes that it has insufficient video data to complete a field, it sends a duplicate field 144 to the decoder as necessary to fill the gap of the missing data. This is illustrated by the assembled video stream 156 which illustrates one of the samples S3, being replaced by the preceding field S2.

Processing Overview: Audio/Video Synchronization

Figure 17:
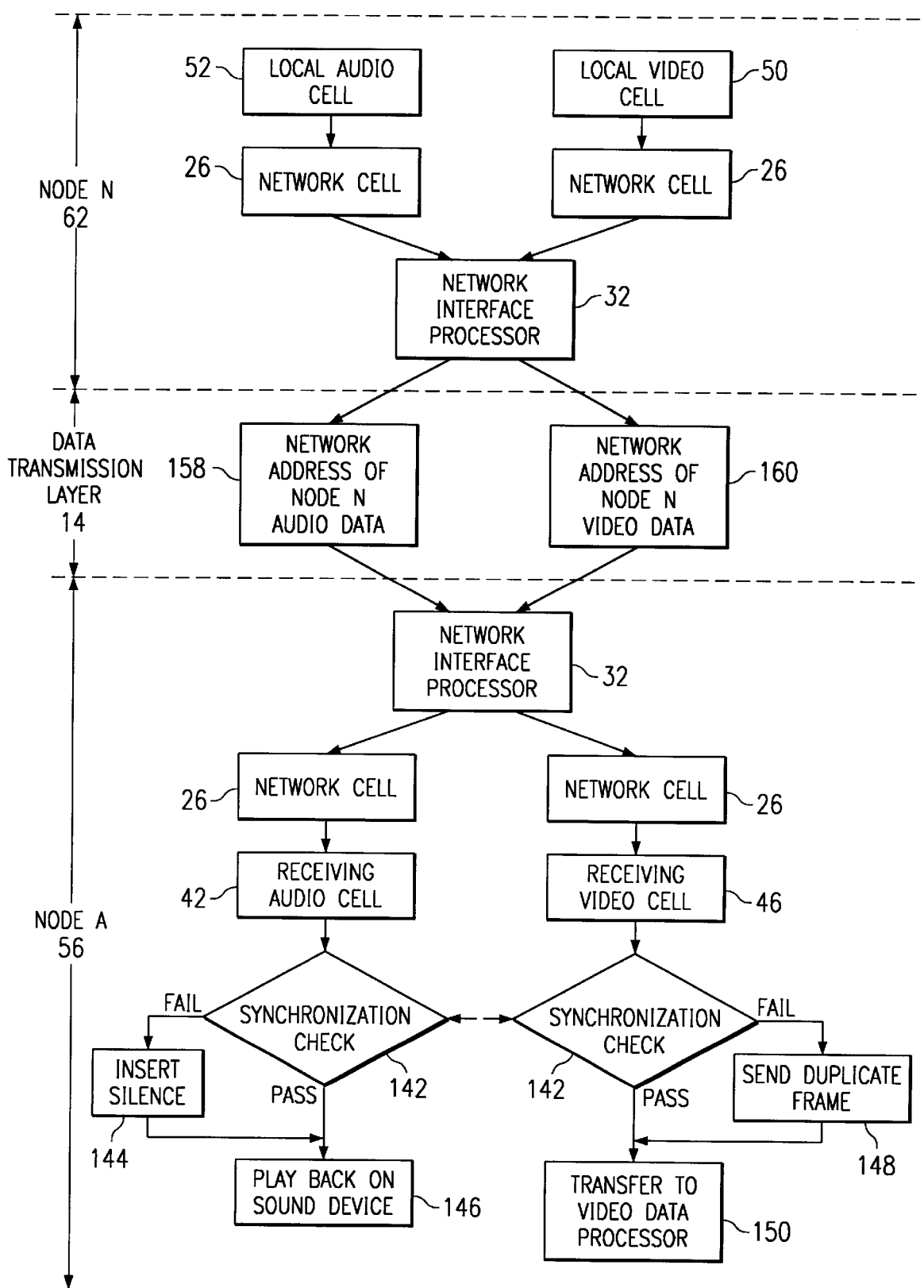
FIG. 17 illustrates a flowchart depicting the process of audio and video synchronization.

Referring now to FIG. 17, there is illustrated a flow chart of the audio/video synchronization process. This illustrates the processes executed to ensure synchronization of audio and video data during a conference between two nodes (node N 62 and node A56). These nodes are identical to the node 10 illustrated in FIG. 1. As described hereinabove, the transmitting node (node N, 62) has a local audio cell 52 and a local video cell 50. These are bound to individual network cells 26 and use the network interface processor 32 to send data to addresses 152, 154 on the data transmission layer 14. The network cells are identical in function, but may be bound to different addresses and processes.

The receiving node (node A, 56) has created network cells 26 that are uniquely associated with the addresses 152, 154 on the data transmission layer 14 where the sending node (node N, 62) is sending its audio and video data. The network cell 26 and the network interface processor 32 of node A 56 transfer the audio data that has been received from the network to a receiving audio cell 42. The corresponding video data that has been received from the network is transferred to a receiving video cell 46. This data is in the format illustrated in FIG. 21 hereinbelow.

Both the receiving audio cell 42 and the receiving video cell 46 evaluate the time stamp of their packets (field 126 of FIG. 21) against the time stamp of the message being held by the other cell. The reason for this is that, as described hereinabove, the data transmission layer 14 is unreliable by design and packets may be lost or damaged in transmission. When a packet is lost, the time stamps under comparison cease to agree and the amount by which they disagree makes it evident whether audio or video data is missing. This makes it possible for the audio and video cells to take appropriate actions to deal with the fault. As described hereinabove, the audio cell 42 inserts silence for missing data, while the video cell 46 replicates the previous field of data. In both cases, processing continues with the repaired data in the same fashion as it would have continued with undamaged data.

Processing Overview: Data Recording and Playback

Figure 18:
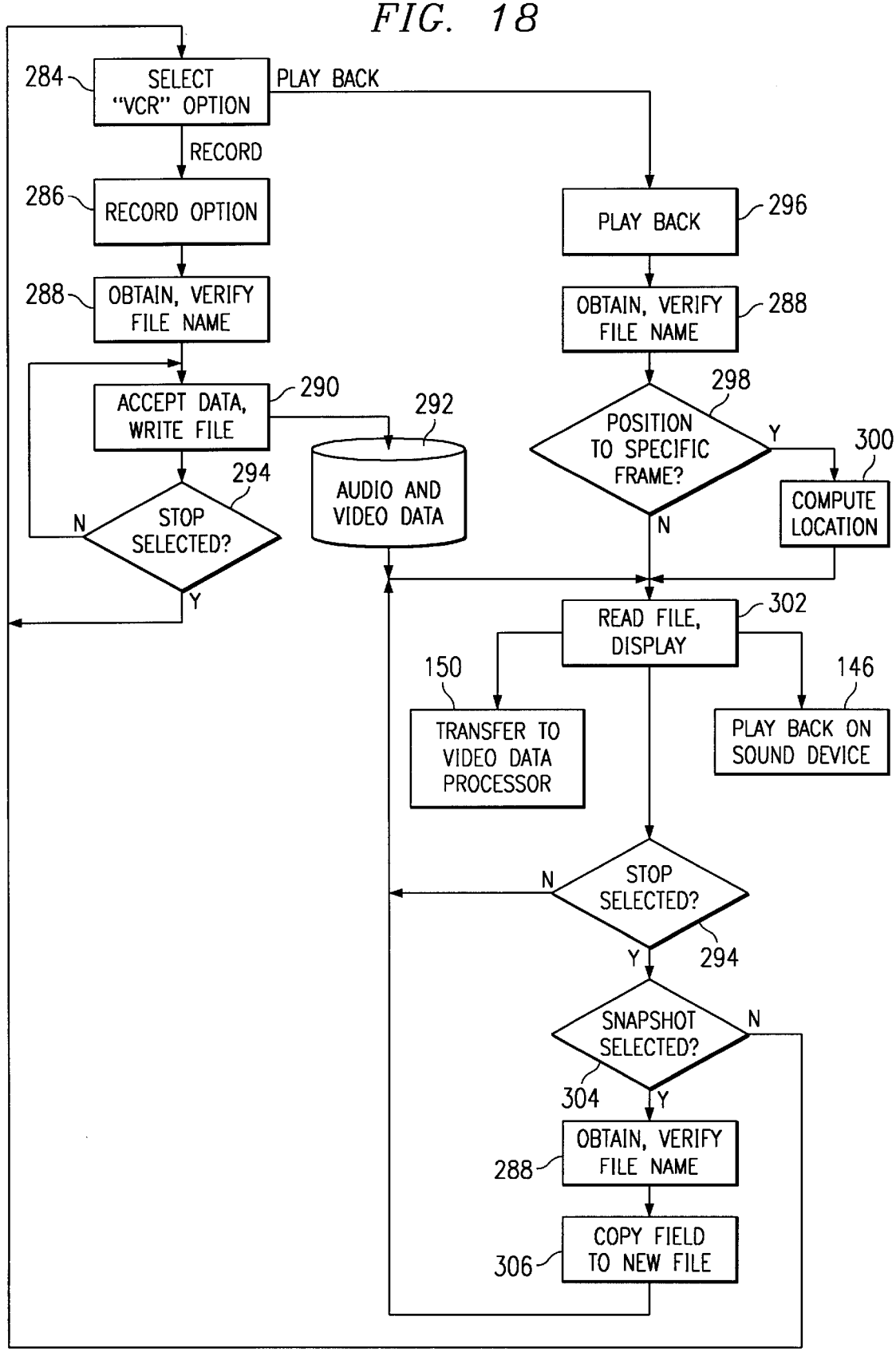
FIG. 18 illustrates the features for data recording and playback.

Referring now to FIG. 18, there is illustrated a block diagram of a node in near-side recording mode. In this operational mode, the user of the node can direct that the video from the user's own video and audio sources be transferred in encoded format to a storage device. The external functional appearance of this is similar to a conventional VCR.

The block diagram of FIG. 18 is illustrated as a diagrammatic view. In the block 284, the select operation is illustrated wherein the user can select the VCR option. Once selected, there are two options, a record option in a block 286 or a playback option in a block 296. If the record option is selected, the system will flow to a block 288 to obtain and verify the file name and then to a block 290 to accept the data and then write the data to a file. This will then flow to a decision block 294 to determine if the operation has been stopped. If not, the program will continue to accept the data and write the data to the file. If stopped, the program will flow back to the beginning of the program at block 284. During writing, data is written to a memory block 292 which is operable to store the audio and video data.

If the playback operation is selected at block 296, then the program flows to a block 288 to obtain and verify the filename, and then to a block 292 to determine if a specific frame is selected. If so, the program will flow to a block 300 to compute the location, and then to a block 302 to read the file and display the output of the file. If the system is not positioned to a specific frame, the program will flow directly to the block 302. The block 302 extracts the data from the memory 292 and passes it to the block 146 to play back the sound device and to the block 150 to transfer information to the video processor for processing as described hereinabove. The reading and displaying continues until stopped, as determined by a decision block 294. The program will then flow to a decision block 304 to determine if the snapshot feature was selected. The snapshot feature allows a user to capture a single image frame and copy it to a file for later use. This is facilitated by the fact that the compression algorithm always transmits the complete picture. If the snapshot feature is not selected, the program will flow back to the input of the block 284 and, if so, the program will flow to a block 288 to obtain and verify the filename, and then to a block 306 to copy the field to a new file. The program will then flow to the block 302 to read the file and display the information.

The above-noted playback and record features are provided to allow the user to record the compressed data stream to disk, to play the data back, to "rewind" or "advance" the data by positioning at specific locations, to stop at any specific frame and review the frame or to copy the selected frame to another file. Additionally, a user can play the video backwards. Both the full file and individual images can be converted to conventional file formats for playback by parties who do not have the present system installed. These formats can also be used by conventional video and image editing tools. The data can be manipulated with conventional file management tools; it can be sent as an attachment to EMAIL or otherwise transferred to remote users for viewing. The user is also allowed to record the far-side data stream. Features are provided to allow the recording of selected audio and video data streams.

Processing Overview: Video Answering Machine

Referring now to FIG. 19, there is illustrated a diagrammatic view of the video answering machine feature. As illustrated in FIG. 19, the present system is operational to provide an automated answering attendant when the user of the node is unable to accept video conference requests. In this example, there are illustrated two nodes, node A 56 and node N 62. These nodes are identical in function to the nodes 10 in FIG. 1.

In the first function of this feature, the user of the node is permitted to record a message that is to be automatically played to any node attempting to initiate a conference, as indicated by block 162. This message is recorded to disk, as indicated by block 166, in the same manner as in the data recording feature illustrated in FIG. 18. The user may then set the present system in a state whereby it will not accept any conference requests, but will play the message instead. In FIG. 19, node A is set to such a state at block 164.

In the second function of this feature, when a user of another node (node N, 62 in this example) sends a request to conference 82 to the node that is set to use the automated answering attendant (node A, 56 in this example), the receiving node tests at block 168 to see if it has been set in the answering machine mode. If not, conferencing proceeds as illustrated in FIGS. 10, 11 and 12. If so, a message is presented to the user of the receiving node that identifies the incoming caller and shows that the incoming call is being automatically answered. The purpose of this is to allow the user of node A (if present) to override the automated answer attendant if they wish. At the same time, the present system reads, as indicated by block 170, the data file recorded by the user of node A and transmits this over the messaging layer to the user at node N. It also transmits a message to the user of node N indicating that the user may leave a message at node A if they so wish, as indicated by block 172.

If the user at node N does not respond with a message or responds negatively, the session is terminated. If the user does wish to leave a message, node N allows the user to send, as indicated by block 176, a message 178 to node A, which records it. This is recorded automatically at node A, as indicated by block 188, in the same manner that audio and video data is recorded with the data recording feature described in FIG. 18 at block 166. Features are provided for the user at node A to recognize at block 190 that there are messages waiting and to play back any messages that were received when the auto-answer attendant was set on.

Data Formats: Audio and Video Messages

Figure 20:
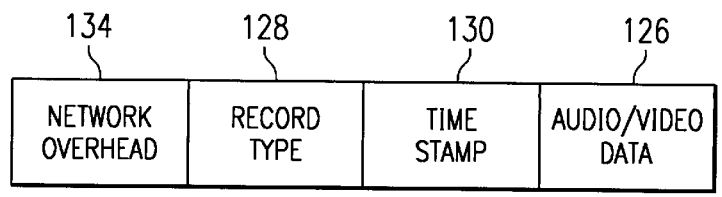
FIG. 20 illustrates a diagrammatic view of the various fields in a packet of data sent over the network.

Referring now to FIG. 20, there is illustrated a diagrammatic view of a packet of audio and/or video data. These are the packets that are sent to the addresses on the data transmission layer.

As will be described hereinbelow, the video information is composed of a plurality of fields. The reason for this is that even when compressed, the video information for a given picture is quite large, too large for transmission in a single network packet. Therefore, each field of compressed video is divided into packets 126 prior to transmission. These may, in turn, be further fragmented by the network processing hardware during the process of transmission. By comparison, a plurality of samples of the audio data can be transmitted in a single packet 126. Each packet contains a field 128 which indicates whether the information contained in the packet is audio or video. Also contained in the datagram is a time-stamp 130 that is utilized for synchronization of the audio and video data streams. As described hereinabove, the network cell and the network interface processor add header information 134 that is needed by various processing layers of the network (the transport layer, the internet layer and the physical layer) to move the data to its specified destination. This information is a conventional requirement for transmission over an IP-based network.

Hardware Architecture: Overview

Figure 21:
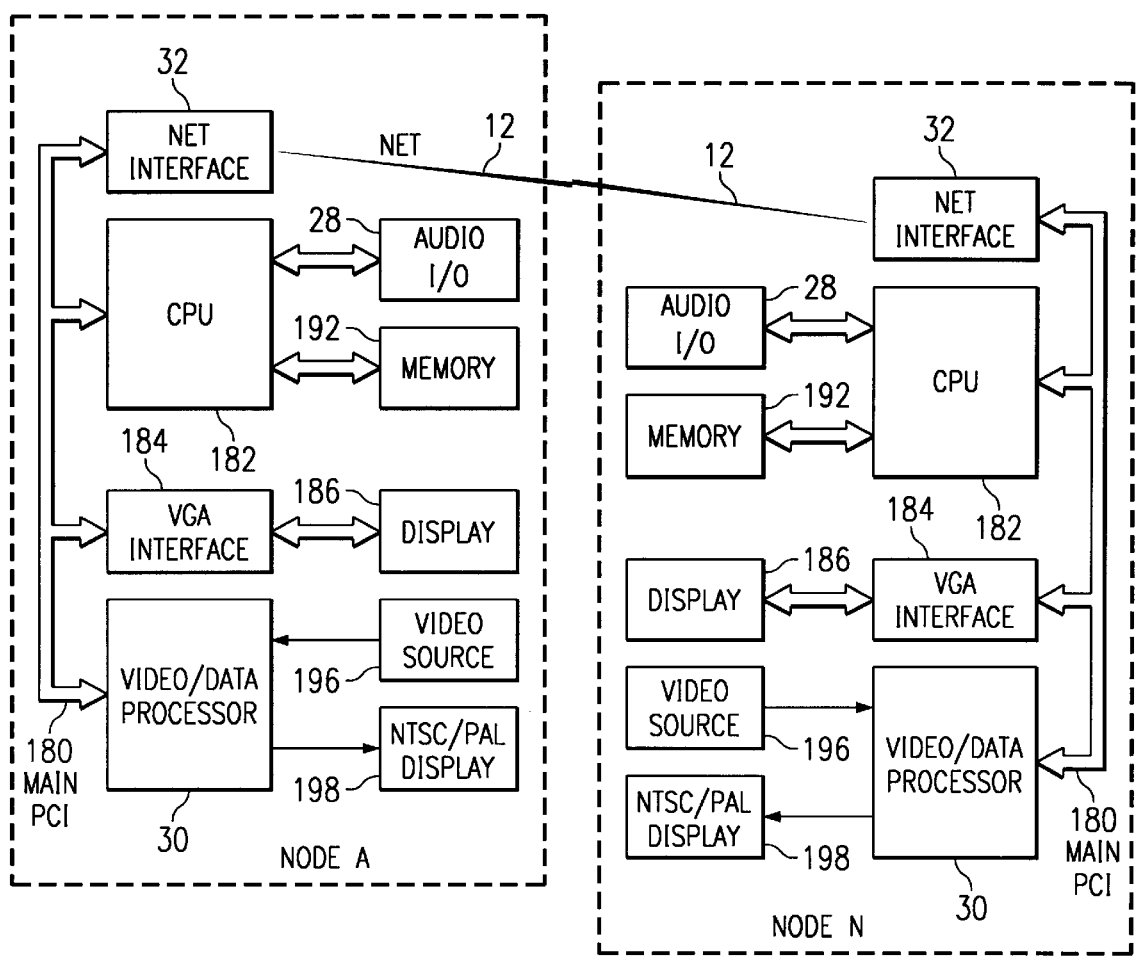
FIG. 21 illustrates a block diagram of the overall system for two nodes interacting with each other.

Referring now to FIG. 21, there is illustrated a block diagram of two nodes in the system communicating over the network 14. These nodes are identical to the node 10 depicted in FIG. 1. Each of the nodes, node A 56 and node N 62, have a main PCI bus 180 associated therewith. The PCI bus 180 allows a CPU 182 to communicate with other peripheral systems on the bus 180. This bus is compliant with the specification for PCI 2.1. There is provided a PCI-based VGA interface card 184, which interfaces with a display 186 and a network interface processor 32 that interfaces with the network 12. These are all conventional PCI-based peripheral systems.

The basic portion of the system that interfaces with the PCI bus 180 comprises the video data processor 30, which is operable to transfer data via the PCI bus 180 to and from the network interface card 32, the CPU 182 and the memory 192 associated with the CPU 182. The video data processor is also operable to interface with a video source 196 to receive video data and also with a video output device, such as an NTSC or PAL television or VCR 198. The video data processor 30 operates under the direction of the local and receiving video cells. These are resident on the CPU and utilize the video data processor for the purposes of video capture, compression, decompression and display. In operation, the video data processor 30 is operable in two modes:

1. to receive video from the video source 196, to compress it and to output it in uncompressed format; and
2. to receive video from the network, to decompress it and to output it in compressed format.

Local video is submitted directly to the video data processor 192. After processing, the local video cell directs the video data processor 30 to transfer its output via the PCI bus 180 to the network interface processor 32, which operates under the control of the network cells. Incoming video information is received through the network interface processor 32, managed by the network cell and stored in the memory 192 after removal of the network overhead. It is then released to the control of the receiving video cell, which is resident in CPU 182. Under control of the receiving video cell, the compressed video information is sent to the video data processor for decompression and video enhancement, processes that are described in more detail hereinbelow. ARer processing, the data is in a format that can be directly output to the VGA interface and shown on the VGA display or the NTSC display. Incoming audio information is routed by the receiving audio cell directly to the computer's audio I/O system 28. Local audio data is generated by the audio I/0 subsystem 28. This data is processed by the local audio cell and released through the network cell to the network interface processor 32 for transport to the other node. It is noted that video can be transmitted from Node A to Node N in one video format while video transmission in the other direction can be in a different format. This will be described in more detail hereinbelow.

Hardware Architecture: Detail Design

Figure 22:
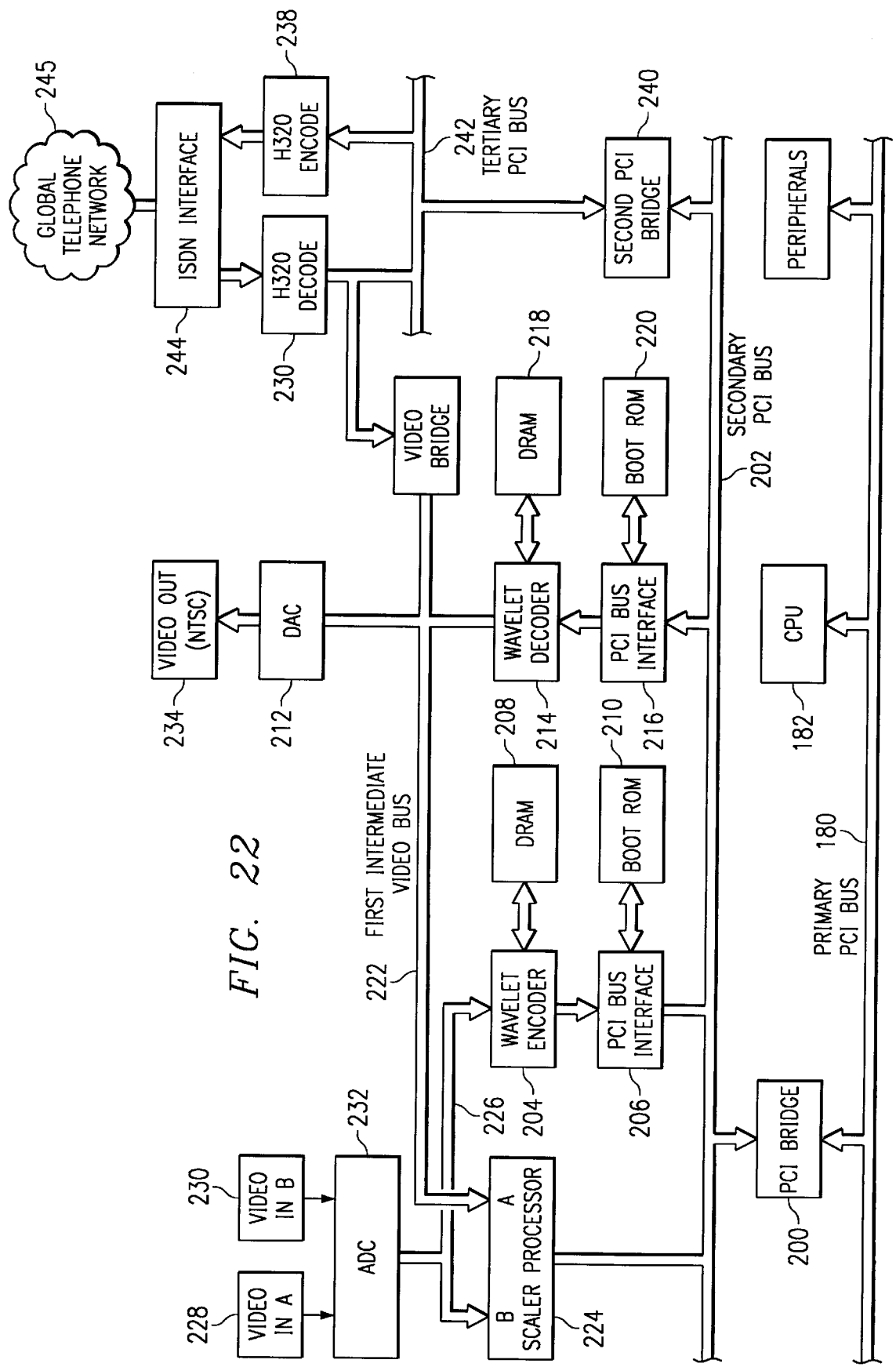
FIG. 22 illustrates a more detailed block diagram of a given node.

Referring now to FIG. 22, there is illustrated a more detailed block diagram of each of the nodes. The system employs a conventional PCI-based architecture wherein CPU 182 is interfaced directly with a primary PCI bus 180. The PCI bus 180 has limitations inasmuch as it allows only one clock, one grant and one request per physical PCI device. Normally, each PCI slot on the computer's motherboard is expected to host a single PCI device.

The design of the present system required that each function (scaler, encoder and decoder) be provided separate clock, grant and request lines. To expand the capability of the PCI bus to meet this requirement, a PCI bridge circuit 200 is utilized. The integrated circuit that is utilized to realize the operation of the PCI bridge 200 is a DEC21152 manufactured by Digital Equipment Corporation. This integrated circuit is operable to interface a maximum of four additional PCI devices to the secondary PCI bus 202. In the preferred embodiment, the PCI bus interfaces with a video wavelet encoder chip 204, a video wavelet decoder chip 214 and a scaler processor chip 224. As described hereinbelow, one slot on the secondary bus is left available for future features.

The video encoding is performed by a wavelet encoder chip 204, which is interfaced to the secondary PCI bus 202 through a PCI bus interface 206. The wavelet encoder chip 204 interfaces with an associated dynamic random access memory (DRAM) 208 and the PCI bus interface chip 206 interfaces with a boot readonly memory (ROM) 210. The wavelet encoder chip 204 is a self-contained integrated circuit, part number ADV601, that is manufactured by Analog Devices. This chip interfaces with the secondary PCI bus 202 through an AMCCS5933 integrated circuit, manufactured by AMCC. The wavelet encoder chip 204 utilizes a conventional wavelet encoding algorithm for the video compression.

The same wavelet integrated circuit can also be utilized in a decode operation. This function is provided by a wavelet decoder chip 214 which interfaces with the PCI bus 202 through a PCI bus interface 216. The wavelet decoder chip 214 also has a DRAM 218 and the PCI bus interface chip 216 and a boot ROM 220. The wavelet decoder chip 214 receives data compressed in accordance with the wavelet algorithm and decompresses the video information for output on the first intermediate video bus 222.

The first intermediate video bus 222 is operable to be input to the scaler processor 224, which is a 7146 scaler processor manufactured by Philips. The scaler processor 224 is a PCI-based device and, therefore, interfaces directly with the secondary PCI bus 202. The scaler processor 224 also has a second input that is interfaced with a second video bus 226. This video bus is operable to receive the local digital video data for input to the wavelet encoder 204 and to the scaler processor 224. The video that is placed onto the second video bus 226 is received from one of two local video input sources 228 or 230, which are processed through an analog-to-digital converter 232 to provide digital video. The first video bus 222 is also output through a digital-to-analog converter 212 directly to a video output device 234, for example, an NTSC or PAL format television or video recorder.

In addition to the scaler processor operator and the encode/decode operation on the PCI bus 202, there is also provided the possibility of interfacing through an additional PCI bridge device 240 to a tertiary PCI bus 242. The tertiary PCI bus 242 allows additional devices to be interfaced with the secondary PCI bus 202. This is a conventional architecture to hierarchically add more PCI bus devices.

This feature can be utilized to support additional devices and protocols. For example, many conventional video conferencing systems utilize the H.320/H.261 standard and communicate over ISDN telephone lines 248. By adding a PCI-based device that can accept H.320 transmission from an ISDN telephone line and translate it to a message that can be sent through the PCI bus 242, a user can actually interface with systems that process audio and video in completely different formats and protocols than those used by the present system to transmit information over the network. The only requirement is that processing cells must exist and have capability such that, when the user wishes to use data from such systems, the audio and video can be translated from the other format and protocol to that used by the present system. For example, as illustrated in FIG. 22, information would be received through the global telephone network 245, processed through the ISDN interface 244 and translated to an appropriate format for display or retransmission. It should be understood that one advantage provided by the present system is that this architecture is specifically expandable to include cells with these translation capabilities.

The scaler processor 224 is operable under the direction of the video cell to interface with the VGA interface card 184 and controls the output data stream. This is a conventional chip and provides that function. The scaler processor is operable to provide image sizing (scaling). It is also, however, capable of accepting instructions to mathematically calculate values for missing pixels of information and to perform other complex image processing functions. Thus, under some circumstances, the present system may use the scaler for image smoothing and other functions that improve picture quality. In addition, under control of the video cells, the user of the node is provided features for:

1. image format conversion (mixed NTSC and PAL input)
2. image reversal
3. image enlargement.

It is noted that with the architecture of the present system, there are provided two paths for the decode/encode operation. There is a separate and distinct encode path, and a separate and distinct decode path. Therefore, the operations are distinct and they can and are operated asynchronously. This asynchronous operation allows for different formats to be decoded and encoded at the same time. For example, one could encode NTSC video and simultaneously decode PAL video. Further, it can be seen that the operation is truly bidirectional in that data can be independently streamed out of the system while being encoded and compressed and can be streamed into the system, decoded and decompressed for display.

Summary

There has been provided a video/audio communications system that is operable to communicate between nodes over a network utilizing the protocols of the global communication network. These protocols allow users to transmit video and audio over the network to a defined address that is accessible by one or more nodes on the network.

When operational in multi-party conferencing mode, the information can be accessed by any authorized node. To enter a call, it is only necessary for each party to be authorized by one of the participants of the call and to know the addresses to which the other parties are sending their audio and video. Once these addresses are available, a particular node on the network can have access to all the information of the other nodes and can assemble it into a call.

Each of the nodes in the network operates independently of the other nodes inasmuch as it determines the exact configuration of the call. Furthermore, there exists no server among the nodes to define the operation of any of the systems. Each user on the system can initiate and participate in both two party and multi-party joined conferences as well as multi-party disjoined conferences. The nodes may also operate in a low-overhead one-way "broadcast" mode.

The audio and video of each node may also have different characteristics. Some of the elements that may vary are the video format (NTSC or PAL), the data compression rate and the frame rate of the video. Provision is also made for accepting data in varying protocols. The present invention is capable of receiving and simultaneously processing incoming data with different characteristics and allowing the user to tailor the appearance (or non-appearance) of the data to meet their individual requirements.

Although the preferred embodiment has been described in detail, it should be understood that various changes, substitutions and alterations can be made therein without departing from the spirit and scope of the invention a defined by the appended claims.

What is claimed is:

1. A video communication system, comprising:
    a data communications network: and
    a plurality of nodes disposed about said data communications network, each of said nodes having:
        a video source for generating digital video data, a data transmitter for transmitting said digital video data to said data communications network on a defined address in a message protocol, which digital video data at said defined address is accessible from said data communications network by substantially all of said nodes on said data communications network, a data receiver for receiving from said data communications network digital video data at said defined addresses, a configuration table for storing information as to select ones of said defined addresses on said data communications network to define a local group of said select ones of said defined addresses for said associated node, a configuration device for configuring said configuration table to define said local group for said associated node and to control said data receiver to receive only video data from ones of said defined addresses within said local group, and a display device for processing and displaying digital video data received from said data communications network at select ones of said defined addresses within said local group, said configuration device determining which of said ones of said defined addresses in said local group constitute said select ones for displaying said associated digital video data by said display device;

wherein said configuration table is operable to store information as to select ones of said defined addresses on said data communications network that define more than a single local group, with each of said local groups comprised of select ones of said defined addresses and which defined addresses in each of said local groups can be different for said associated node, and wherein said configuration device is operable to select between ones of said local groups.

2. The video communications system of claim 1, wherein said configuration device controls said data receiver to receive digital video data only at said select ones of said defined addresses within said local group that are to be processed and displayed by said display device.

3. The video communications system of claim 1, wherein said defined addresses on said data communications network are in a multicast address protocol which are receivable by all of said nodes when interfaced with said data communications network.

4. The video communications system of claim 1, where each of said nodes further comprises:

an audio source for generating digital audio data associated with said digital video data;

said data transmitter operable to transmit said digital audio data to said data communications network on said defined address associated with said node to said data communications network in said message protocol;

said data receiver operable to receive from said data communications network digital audio data from said defined addresses within said local group; and an audio output device for processing and outputting digital audio data received by said data receiver at select ones of said defined addresses within said group, said configuration device determining which of said defined addresses comprise said select ones of said defined addresses within said local group.

5. The video communications system of claim 4, wherein said configuration device is operable to control said data receiver to receive digital audio data from said data communications network at substantially all of said defined addresses in said local group.

6. The video communications system of claim 4, wherein said defined address for each of said nodes is comprised of a first defined address for transmission of said digital video data and a second defined address for transmission of digital audio data, said second defined address distinct from said first defined address, and wherein said data receiver is operable to receive digital video data from said first defined addresses on said data communications network and said digital audio data from said second defined addresses on said data communications network, and said data transmitter is operable to transmit said digital video data on said first defined address and said digital audio data on said second defined address.

7. The video communications system of claim 1, wherein each of said nodes further comprises:

a data compression device for selectively compressing a portion of said digital video data prior to transmission thereof by said data transmission device in accordance with a predetermined data compression algorithm; and a data decompression device for decompressing said received digital video data from said data communications network in accordance with said predetermined data compression algorithm.

8. The video communications system of claim 7, where said predetermined data compression algorithm comprises a wavelet data compression algorithm.

9. The video communication system of claim 1, wherein said data transmitter operates independently of said data receiver on the other of said nodes and said data receivers on each of said nodes operate independently from said data receivers on the other of said nodes.

10. The video communications system of claim 1, where said local group of said select defined addresses includes a logical group of defined addresses that define a call, wherein said logical group of defined addresses with said local group are stored in said configuration tables for each of said nodes associated with said addresses in said logical group.

11. A video communication system, comprising:

a data communications network; and a plurality of nodes disposed about said data communications network, each of said nodes having:

a video source for generating digital video data, a data transmitter for transmitting said digital video data to said data communications network on a defined address in a message protocol, which digital video data at said defined address is accessible from said data communications network by substantially all of said nodes on said data communications network, a data receiver for receiving from said data communications network digital video data at said defined addresses, a configuration table for storing information as to select ones of said defined addresses on said data communications network to define a local group of said select ones of said defined addresses for said associated node, a configuration device for configuring said configuration table to define said local group for said associated node and to control said data receiver to receive only video data from ones of said defined addresses within said local group, and a display device for processing and displaying digital video data received from said data communications network at select ones of said defined addresses within said local group, said configuration device determining which of said ones of said defined addresses in said local group constitute said select ones for displaying said associated digital video data by said display device;

where said data communications network comprises a message portion and a command portion, said command portion carrying command information between said nodes in a command protocol and said message portion carrying said transmitted digital video data on said defined addresses from all of said nodes in said message protocol, each of said nodes having:

a command generator for generating command information for transmission to at least one other of said nodes;

a command transmitter for transmitting said generated command information over said command portion of said data communications network in said command protocol;

a command receiver for receiving command information from other of said nodes over said command portion of said data communications network;

a command decoder for decoding said received command information from said command receiver; and said command information utilized by said configuration device to generate said information stored in said configuration table.

12. The video communications system of claim 11, wherein said command protocol requires that a transmitting one of said nodes directly address a receiving one of said nodes such that a direct communications link is established between said transmitting and receiving nodes and requiring a handshake between said transmit and receiving nodes for transmission of data therebetween with confirmation required by the receiving node.

13. The video communication system of claim 11, wherein each of said nodes further comprises:

an encryption device for encrypting said digital video data prior to transmission thereof in accordance with a predetermined encryption algorithm and a decryption device for decryption said encrypted digital video data after reception thereof by said data receiver.

14. The video communications system of claim 13, wherein said predetermined encryption algorithm requires encryption information to be transmitted to receiving ones of said nodes from the transmitting one of said nodes, said encryption information generated by said command generator as part of said generated command information and said received command information utilized after decoding thereof by said command decoder by said decryption device.

15. A video communication system, comprising:

a data communications network; and a plurality of nodes disposed about said data communications network, each of said nodes having:

a video source for generating digital video data, a data transmitter for transmitting said digital video data to said data communications network on a defined address in a message protocol, which digital video data at said defined address is accessible from said data communications network by substantially all of said nodes on said data communications network, a data receiver for receiving from said data communications network digital video data at said defined addresses, wherein said data transmitter operates independently of said data receiver on the other of said nodes and said data receivers on each of said nodes operate independently from said data receivers on the other of said nodes;

a configuration table for storing information as to select ones of said defined addresses on said data communications network to define a local group of said select ones of said defined addresses for said associated node, and a display device for processing and displaying digital video data received from said data communications network at select ones of said defined addresses within said local group wherein said data communications network comprises a message portion and a command portion, said command portion carrying command information between said nodes in a command protocol and said message portion carrying said transmitted digital video data on said defined addresses from all of said nodes in said message protocol, each of said nodes having:

a command generator for generating command information for transmission to at least one other of said nodes;

a command transmitter for transmitting said generated command information over said command portion of said data communications network in said command protocol;

a command receiver for receiving command information from other of said nodes over said command portion of said data communications network;

a command decoder for decoding said received command information from said command receiver; and said command information utilized by said configuration device to generate said information stored in said configuration table.

16. The video communications system of claim 15, wherein said configuration device controls said data receiver to receive digital video data only at said select ones of said defined addresses within said local group that are to be processed and displayed by said display device.

17. The video communications system of claim 15, where each of said nodes further comprises:

an audio source for generating digital audio data associated with said digital video data;

said data transmitter operable to transmit said digital audio data to said data communications network on said defined address associated with said node to said data communications network in said message protocol;

said data receiver operable to receive from said data communications network digital audio data from said defined addresses within said local group; and an audio output device for processing and outputting digital audio data received by said data receiver at select ones of said defined addresses within said group, said configuration device determining which of said defined addresses comprise said select ones of said defined addresses within said local group.

18. The video communications system of claim 17, wherein said configuration device is operable to control said data receiver to receive digital audio data from said data communications network at substantially all of said defined addresses in said local group.

19. The video communications system of claim 17, wherein said defined address for each of said nodes is comprised of a first defined address for transmission of said digital video data and a second defined address for transmission of digital audio data, said second defined address distinct from said first defined address, and wherein said data receiver is operable to receive digital video data from said first defined addresses on said data communications network and said digital audio data from said second defined addresses on said data communications network, and said data transmitter is operable to transmit said digital video data on said first defined address and said digital audio data on said second defined address.

20. The video communications system of claim 15, wherein said command protocol requires that a transmitting one of said nodes directly address a receiving one of said nodes such that a direct communications link is established between said transmitting and receiving nodes and requiring a handshake between said transmit and receiving nodes for transmission of data therebetween with confirmation required by the receiving node.

21. The video communication system of claim 15, wherein each of said nodes further comprises:
  an encryption device for encrypting said digital video data prior to transmission thereof in accordance with a predetermined encryption algorithm, and
  a decryption device for decryption said encrypted digital video data after reception thereof by said data receiver.

22. The video communications system of claim 21, wherein said predetermined encryption algorithm requires encryption information to be transmitted to receiving ones of said nodes from the transmitting one of said nodes, said encryption information generated by said command generator as part of said generated command information and said received command information utilized after decoding thereof by said command decoder by said decryption device.

23. The video communications system of claim 15, wherein said configuration table is operable to store information as to select ones of said defined addresses on said data communications network that define more than a single local group, with each of said local groups comprised of select ones of said defined addresses and which defined addresses in each of said local groups can be different from for said associated node, and wherein said configuration device is operable to select between ones of said local groups.

24. The video communications system of claim 15, wherein each of said nodes further comprises:
  a data compression device for selectively compressing a portion of said digital video data prior to transmission thereof by said data transmission device in accordance with a predetermined data compression algorithm; and
  a data decompression device for decompressing said received digital video data from said data communications network in accordance with said predetermined data compression algorithm.

25. The video communications system of claim 24, where said predetermined data compression algorithm comprises a wavelet data compression algorithm.

26. The video communications system of claim 15, wherein said local group of said select defined addresses includes a logical group of defined addresses that define a call, wherein said logical group of defined addresses with said local group are stored in said configuration tables for each of said nodes associated with said addresses in said logical group.

27. The video communications system of claim 15, wherein said defined addresses on said data communications network are in a multicast address protocol which are receivable by all of said nodes when interfaced with said data communications network.

* * * * *